(12) United States Patent
Guionnet et al.

(10) Patent No.: US 11,240,521 B2
(45) Date of Patent: Feb. 1, 2022

(54) METHOD FOR IMAGE PROCESSING AND APPARATUS FOR IMPLEMENTING THE SAME

(71) Applicant: ATEME, Velizy Villacoublay (FR)

(72) Inventors: Thomas Guionnet, Rennes (FR); Sébastien Herbreteau, Rennes (FR)

(73) Assignee: ATEME, Velizy Villacoublay (FR)

( * ) Notice: Subject to any disclaimer, the term of this patent is extended or adjusted under 35 U.S.C. 154(b) by 0 days.

(21) Appl. No.: 17/307,364

(22) Filed: May 4, 2021

(65) Prior Publication Data

US 2021/0344940 A1   Nov. 4, 2021

(30) Foreign Application Priority Data

May 4, 2020   (EP) .................................... 20305437

(51) Int. Cl.
| | |
|---|---|
| *G06T 5/00* | (2006.01) |
| *H04N 19/46* | (2014.01) |
| *H04N 5/262* | (2006.01) |
| *H04N 19/36* | (2014.01) |

(52) U.S. Cl.
CPC .............. *H04N 19/46* (2014.11); *G06T 5/002* (2013.01); *H04N 5/262* (2013.01); *H04N 19/36* (2014.11)

(58) Field of Classification Search
CPC ........ H04N 19/46; H04N 19/36; H04N 5/262; G06T 5/002
See application file for complete search history.

(56) References Cited

U.S. PATENT DOCUMENTS

| | | | |
|---|---|---|---|
| 2004/0264795 A1 | 12/2004 | Fielding | |
| 2011/0019094 A1* | 1/2011 | Rossignol | .................. G06T 5/40 348/607 |
| 2014/0029849 A1* | 1/2014 | Sen | .......................... G06T 5/001 382/167 |

(Continued)

OTHER PUBLICATIONS

Norkin et al., "Film Grain Synthesis for AV1 Video Codec," 2018 Data Compression Conference, IEEE, Mar. 27, 2018, pp. 3-12.

(Continued)

*Primary Examiner* — Richard T Torrente
(74) *Attorney, Agent, or Firm* — Nixon & Vanderhye

(57) ABSTRACT

A method of method of processing an image includes: determining estimates of parameters of an auto-regressive, parametric model of noise, according to which a current noise pixel is computed combining linear combination of previous noise pixels in a causal neighborhood of the current noise pixel weighted by respective model linear combination parameters with a generated noise sample corresponding to an additive Gaussian noise of model variance parameter; performing a convergence check loop, each iteration including: generating a noise template of noise pixels based on the estimated model parameters, the noise template having predetermined pixel size smaller than the image pixel size; estimating a noise template variance; if the estimated variance is below a first predetermined threshold or above a second predetermined threshold, proportionally decreasing the model linear combination parameters with a predetermined correcting factor, and performing another convergence check loop; otherwise exiting the convergence check loop.

20 Claims, 15 Drawing Sheets

(56) References Cited

U.S. PATENT DOCUMENTS

2019/0147628 A1* 5/2019 Bippus ................. G06T 7/0002
382/264

OTHER PUBLICATIONS

Norkin et al., "Film Grain Synthesis for AV1 Video Codec," 2018 Data Compression Conference, IEEE, Mar. 27, 2018, pp. 3-12.
Norkin (Netflix), A: Film Synthesis Support, 17, JVET Meeting, Jan. 7, 2020-Jan. 17, 2020, Jan. 8, 2020.
de Rivaz et al., "AV1 Bitstream & Decoding Process Specification", Alliance for Open Media (AOM) AV1 specification, https://aomediacodec.github.io/av1-spec/av1-spec.pdf, 681 total pages, Copyright 2018, Last modified: Jan. 8, 2019.
International Telecommunication Union (ITU), "ITU-T recommendation H.264", updated Jan. 10, 2020, https://www.itu.int/rec/T-REC-H.264/_page.print, 2 total pages.
Extended Search Report for EP20305437.4, dated Oct. 6, 2020, 11 pages.

* cited by examiner

METHOD FOR IMAGE PROCESSING AND APPARATUS FOR IMPLEMENTING THE SAME

CROSS-REFERENCE TO RELATED APPLICATIONS

This application claims priority benefit under 35 U.S.C. § 119(d) from European Patent Application No. 20305437.4, filed May 4, 2020, the disclosure of which is incorporated by reference herein in its entirety.

BACKGROUND OF THE INVENTION

Field of the Invention

The present disclosure relates to the field of image processing, in particular image encoding for video stream compression.

Description of the Related Art

Film grain is usual in old motion pictures dating from the times movies were shot with a film camera. The grain, which was a result of chemical effects of the analog film used in the film camera, is no longer present in videos captured with a digital camera. Nevertheless it is common for film makers to add computer-generated grain in materials captured with a digital camera in order to reproduce the esthetic of old movies through the presence of film grain. In view of its random nature, grain present in an image can be modeled as an additive noise, and processed as such.

Video data is often source encoded so as to decrease the amount of resources necessary for its transmission and/or storage in memory. Various video coding or compression standards that have been developed over the recent years, such as H.264/AVC, H.265/HEVC or MPEG-2, may be used for that purpose.

Even though grain may have been added in post-production to a video content, such film grain is considered as part of the video data to be encoded or compressed as much as other components of the video data. However, due to its random nature, grain is difficult to compress with a good efficiency.

With a known video coding or compression scheme, preserving the grain requires a very high bitrate. Conversely, when using a reasonable bitrate, say for a broadcast use case, grain cannot be preserved properly. It is either washed out, or partly removed thus generating undesirable visual artefacts and temporal instability.

Therefore it is desirable to improve the efficiency of video encoding/compression of video data that includes grain by preserving the grain information during the encoding/compression, while preserving performance of the encoder (encoding gain).

There is therefore a need for providing an improved video processing scheme and video encoder and/or decoder implementing the same that address at least some of the above-described drawbacks and shortcomings of the conventional technology in the art.

It is an object of the present subject disclosure to provide an improved video processing scheme and apparatus implementing the same.

Another object of the present subject disclosure is to provide an improved video encoding or compression and/or video decoding or decompression scheme and apparatuses implementing the same.

Another object of the present subject disclosure is to provide an improved video encoding and/or decoding scheme and apparatuses implementing the same for alleviating the above-described drawbacks and shortcomings of conventional video encoding/decoding schemes, in particular with respect to video encoding/decoding schemes of an input video stream to be encoded that contains film grain and/or random noise.

SUMMARY OF THE INVENTION

To achieve these objects and other advantages and in accordance with the purpose of the present subject disclosure, as embodied and broadly described herein, in one aspect of the present subject disclosure, a method of processing an image, a digital video frame, or more generally digital video data, is proposed, which comprises: determining estimates of parameters of an auto-regressive, AR, parametric model of noise contained in the image, according to which a current noise pixel is computed as a combination of a linear combination of P previous noise pixels in a causal neighborhood of the current noise pixel weighted by respective AR model linear combination parameters ($\varphi_1, \ldots, \varphi_P$) with a generated noise sample corresponding to an additive Gaussian noise of AR model variance parameter ($\sigma$), and performing a convergence check loop, wherein each iteration of the convergence check loop comprises: generating a noise template of noise pixels based on the estimated AR model parameters, wherein the noise template is of a predetermined pixel size smaller than the pixel size of the image; determining an estimate ($\sigma_P$) of a variance of the noise template, and if the estimated variance ($\sigma_P$) is below a first predetermined threshold ($T_{min}$) or above a second predetermined threshold ($T_{max}$), proportionally decreasing one or more of the AR model linear combination parameters ($\varphi_1, \ldots, \varphi_P$) with a predetermined correcting factor, and performing a new iteration of the convergence check loop. Otherwise exiting the convergence check loop.

In some embodiments, the AR model may be configured to model grain contained in the image.

In some embodiments, the proposed method may be performed at an encoder configured for encoding the image, and the predetermined pixel size of the noise template may be chosen corresponding to the pixel size of a noise synthesis template used at a decoder to synthesize film grain based on the AR model.

In some embodiments, the predetermined pixel size of the noise template may be chosen to be 64×64 pixels.

In some embodiments, proportionally decreasing the AR model linear combination parameters ($\varphi_1, \ldots, \varphi_P$) with the predetermined correcting factor may comprise dividing each of the AR model linear combination parameters ($\varphi_1, \ldots, \varphi_P$) by the predetermined correcting factor, wherein the predetermined correcting factor is greater than 1. In some embodiments, the predetermined correcting factor may be chosen equal to 1.4.

In some embodiments, the first predetermined threshold ($T_{min}$) may be defined based on the additive Gaussian noise of AR model variance parameter ($\sigma$). In some embodiments, the second predetermined threshold ($T_{max}$) may be defined based on the additive Gaussian noise of AR model variance parameter ($\sigma$).

In some embodiments, the first predetermined threshold $T_{min}$ may be defined as comprising the additive Gaussian noise of AR model variance parameter ($\sigma$) divided by a first predetermined scaling factor ($K_{min}$).

In some embodiments, the second predetermined threshold ($T_{max}$) may be defined as comprising the additive Gaussian noise of AR model variance parameter ($\sigma$) multiplied by a second predetermined scaling factor ($K_{max}$).

In some embodiments, at least one of the AR model linear combination parameters ($\varphi_1, \ldots, \varphi_P$) may be preset to zero. In some embodiments, a number of AR model linear combination parameters that are preset to zero may be chosen based on a pixel resolution of the image.

In another aspect of the present subject disclosure, an apparatus is proposed, which comprises a processor, and a memory operatively coupled to the processor, wherein the apparatus is configured to perform a method as proposed in the present subject disclosure.

In yet another aspect of the present subject disclosure, a video encoder is proposed, which is configured to encode video content comprising a plurality of images, an comprises an apparatus as proposed configured to perform a method as proposed in the present subject disclosure.

In yet another aspect of the present subject disclosure, a non-transitory computer-readable medium encoded with executable instructions which, when executed, causes an apparatus comprising a processor operatively coupled with a memory, to perform a method as proposed in the present subject disclosure, is proposed.

For example, in embodiments, the present subject disclosure provides a non-transitory computer-readable medium encoded with executable instructions which, when executed, causes an apparatus comprising a processor operatively coupled with a memory, to process an image, a digital video frame, or more generally digital video data by performing, via the processor, the determining of estimates of parameters of an auto-regressive, AR, parametric model of noise contained in the image, according to which a current noise pixel is computed as a combination of a linear combination of P previous noise pixels in a causal neighborhood of the current noise pixel weighted by respective AR model linear combination parameters ($\varphi_1, \ldots, \varphi_P$) with a generated noise sample corresponding to an additive Gaussian noise of AR model variance parameter ($\sigma$), and the performing, via the processor, a convergence check loop, wherein each iteration of the convergence check loop comprises: generating, via the processor, a noise template of noise pixels based on the estimated AR model parameters, wherein the noise template is of a predetermined pixel size smaller than the pixel size of the image; determining, via the processor, an estimate ($\sigma_P$) of a variance of the noise template, and if the estimated variance ($\sigma_P$) is below a first predetermined threshold ($T_{min}$) or above a second predetermined threshold ($T_{max}$), proportionally decreasing, via the processor, one or more of the AR model linear combination parameters ($\varphi_1, \ldots, \varphi_P$) with a predetermined correcting factor, and performing, via the processor, a new iteration of the convergence check loop. Otherwise exiting the convergence check loop.

In yet another aspect of the present subject disclosure, a computer program product comprising computer program code tangibly embodied in a computer readable medium, said computer program code comprising instructions to, when provided to a computer system and executed, cause said computer to perform a method as proposed in the present subject disclosure, is proposed.

In another aspect of the present subject disclosure, a data set representing, for example through compression or encoding, a computer program as proposed herein, is proposed.

It should be appreciated that the present subject disclosure can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DESCRIPTION OF THE PREFERRED EMBODIMENTS

Figure 1:
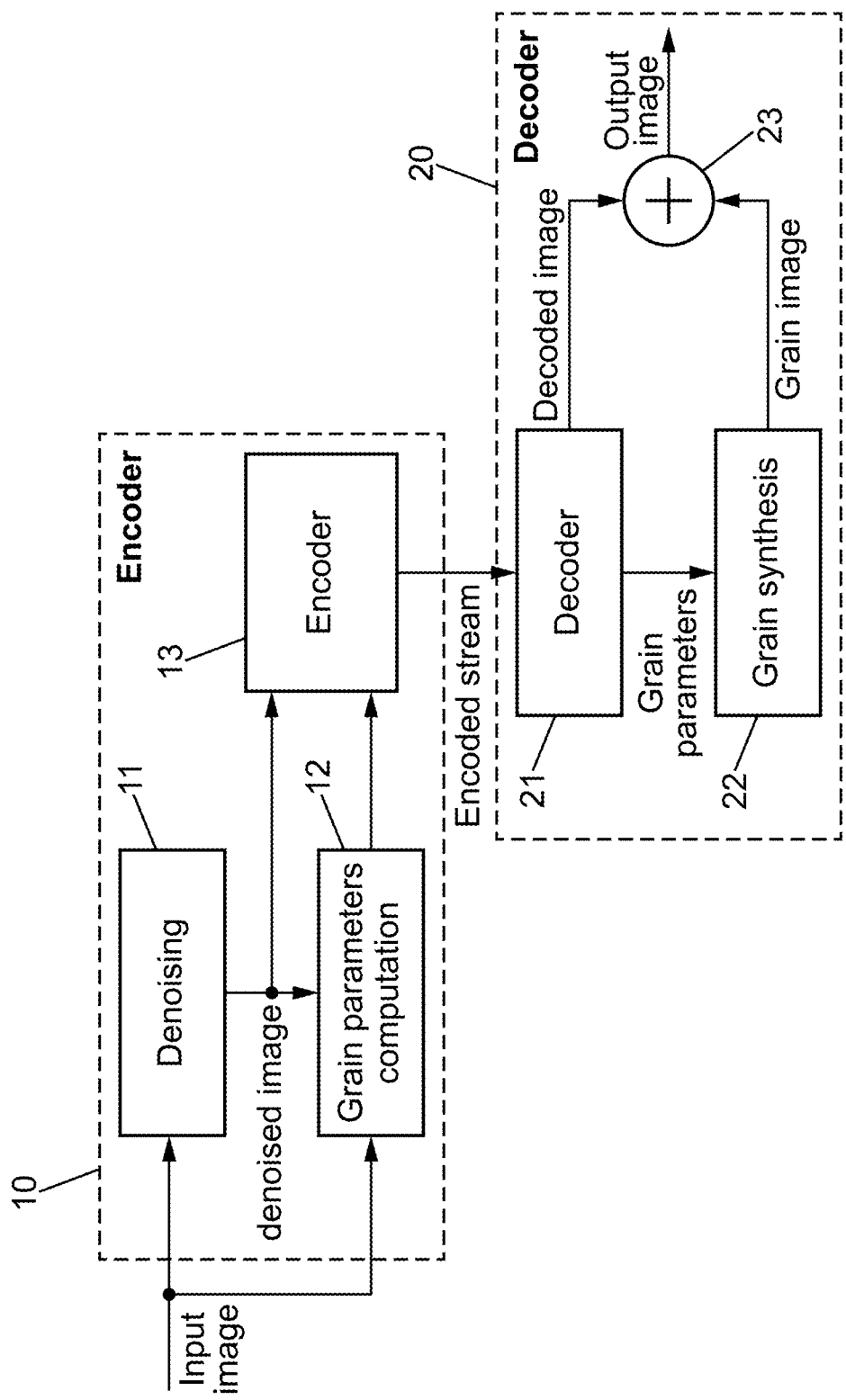
FIG. 1 is a block diagram illustrating an exemplary image encoder/decoder system on which the proposed methods may be implemented in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the subject disclosure. Additionally, elements in the drawing figures are not necessarily drawn to scale. For example, the dimensions of some of the elements in the figures may be exaggerated relative to other elements to help improve understanding of embodiments of the present subject disclosure. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms <<memory>> and <<computer storage media>> include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Python, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be indifferently used to indicate that two or more elements are in direct physical or electrical contact with each other, or two or more elements are not in direct contact with each other, but yet still co-operate or interact with each other.

As used herein, the term "pixel" means a picture element or an elementary component of an image, which may be represented by a numeric value, e.g. a natural integer value. A pixel of a digital image may be coded digitally, and its value may be coded by a bitstream. Further, a pixel of an image may, as the case may be, represent a chrominance or a chroma component, or a luminance or a luma component. In the following, unless stated otherwise, an operation described as applicable to a pixel may be applied to any pixel, regardless of whether the pixel represents a luma component or a chroma component.

The methods proposed in the present subject disclosure may be implemented by any video encoder, video decoder, or video codec configured for encoding and/or decoding images (or frames) of input video data containing grain, film grain and/or noise, such as, for example a video encoder and/or decoder compliant with any of the H.261, MPEG-1 Part 2, H.262, MPEG-2 Part 2, Alliance for Open Media (AOM) AV1, H.264/AVC, H.265/HEVC, MPEG-4 Part 2, and SHVC (Scalable HEVC) specifications or standards, whether in their existing versions and/or their evolutions, as the case may be adapted for implementing one or more embodiments of the proposed methods.

In the following, embodiments of the proposed methods, apparatuses and computer programs are described for the exemplary processing of grain in an image. However, it will be appreciated by those having ordinary skill in the relevant art that other types of noise in images or videos, such as, for example, sensor noise, may be processed in place of or in addition to the grain noise which is given by way of example only according to embodiments of the present subject disclosure.

In some conventional encoding/decoding schemes, such as specified for the AV1 video codec specified by the Alliance for Open Media (AOM), the grain information of an input image (for example of an input video) is not directly encoded, together with other data in the input image, but instead processed using an analysis/synthesis processing.

Using an analysis/synthesis method allows compressing grain through a parametric model. Once analyzing grain information in an input image has provided estimates of grain parameters, the grain can be removed from the input image prior to encoding such image using the chosen encoding scheme (e.g. AV1). The process of removing the grain is sometimes referred to as "denoising", and the image, video, or content from which the grain has been removed is referred to as "denoised". The efficiency of the encoding scheme can be preserved by only encoding the denoised input image or video, while the encoded stream resulting from the encoding of the input image or video comprises the compressed or encoded image or video, together with the corresponding grain parameters.

FIG. 1 shows an exemplary image encoder/decoder system which uses denoising of its input data prior to encoding such data.

Shown on FIG. 1 is an encoder which comprises a denoising engine, a grain parameters computation engine, and an encoder engine. The encoder is configured to receive an input image, which is provided as input to the denoising engine and to the grain parameters computation engine. The denoising engine is configured for removing the grain from the received input image data, which results in a generated denoised image. The denoised image is provided to the grain parameters computation engine which is configured to, based on the input image data and the denoised input image data, compute grain parameters for the grain comprised in the input image data. The computation of grain parameters estimates can use an analysis part of an analysis/synthesis scheme operating on a parametric model of the grain/noise.

As shown on FIG. 1, the denoised image is provided as input to the encoder engine, which also receives as input estimates of grain parameters computed by the grain parameters computation engine. The encoder engine can be configured to process (e.g. encode or compress) the received denoised image data according to any image and/or video encoding scheme, such as, for example a video encoder compliant with any of the H.261, MPEG-1 Part 2, H.262, MPEG-2 Part 2, AV1, H.264/AVC, H.265/HEVC, MPEG-4 Part 2, and SHVC (Scalable HEVC) standards. As a result, the encoder engine may produce an encoded stream which comprises grain parameters estimates received from the grain parameters computation engine and encoded image data generated by itself based on the received denoised image. As a consequence, only the denoised video is compressed and sent to a channel along with the grain parameters.

Also shown on FIG. 1 is a decoder which comprises a decoder engine and a grain synthesis engine. The decoder engine is configured to receive as input data the encoded stream produced by the encoder, and decode the encoded image data comprised in the encoded stream to generate a decoded image. The decoded image data is therefore generated based on the encoded image data resulting from the encoding of the denoised image. The decoder engine may also be configured to extract from the received encoded stream grain parameters data, and provide such grain parameters data to the grain synthesis engine. The grain synthesis engine is configured to, based on the grain parameters data, generate image grain data that correspond to the decoded image produced by the decoder engine. The computation of image grain data can use a synthesis part of the analysis/synthesis scheme operating on a parametric model of the grain/noise that was used by the grain parameters computation engine of the encoder. The decoded image data generated by the decoder engine and the image grain data generated by the grain synthesis engine are combined to generate an output image which is output by the decoder.

That is, at the decoder side, the denoised image is decoded, and a synthetic grain pattern is generated based on the grain parameters estimated at the encoder side, and combined with (for example added to) the decoded image. Therefore, contrary to the principles of image encoding/decoding which are based on fidelity of the decoded image to the input image to be encoded, the resulting grainy image or video is different from the source, while still being visually similar.

Some standard video codec specifications, such as, for example, the AV1 codec specification, define a syntax of grain parameters and specify a grain synthesis scheme to be used as normative/mandatory tools.

Even though the following focuses on a non-limiting example based on the AV1 specification, a person of ordinary skill in the art would understand that the proposed processes, apparatuses and computer programs of the present subject disclosure may be implemented based on any video or image processing or coding standard or specification which addresses noise and/or grain processing in an image, and that such proposed processes, apparatuses and computer programs of the present subject disclosure are not limited to the use of any specific video or image processing or coding standard/specification, and in particular to AV1, which is provided as an example only.

In the present subject disclosure, reference is made to the AV1 specification which is available at the URL https://aomediacodec.github.io/av1-spec/av1-spec.pdf, and incorporated by reference in its entirety in the present subject disclosure.

As part of the analysis/synthesis scheme used therein for grain processing, the AV1 video codec specifications consider an auto-regressive (AR) process for modeling a film grain pattern of an input image, according to which each noise pixel is modelled by a random variable based on the noise pixels in a causal neighborhood. The grain model specified for AV1 assumes that each input video frame can be modelled as a combination (e.g. addition) of a signal without noise and a noise frame corresponding to zero average noise that follows an AR process. Each pixel of the noise frame can be modelled by a random variable which depends on random variables respectively associated with previously generated neighboring pixels of the noise frame.

Figures 2, 3:
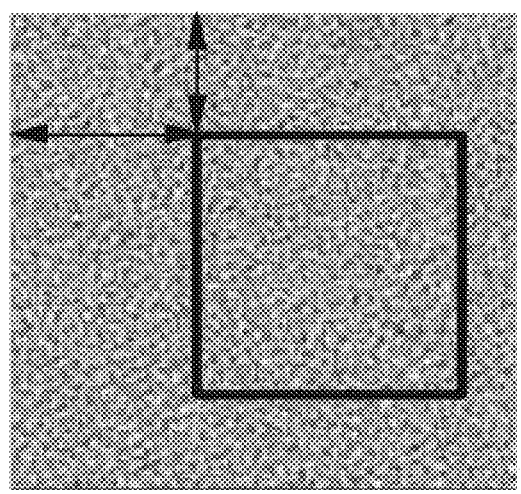
FIG. 2 illustrates an AR model with a lag L=2 that can be used to represent a noise pixel of a noise frame.
FIG. 3 illustrates the selection of a patch (e.g. of size 32×32 pixels) at random coordinates in a grain template.

FIG. 2 illustrates an AR model with a lag L=2 that can be used to represent a noise pixel of a noise frame.

FIG. 2 shows an array of noise pixels comprised in a noise frame, wherein each noise pixel is represented by a respective random variable X. For example, a current noise pixel at position (i,j) in the array is represented by the random variable $X_{i,j}$. According to an AR model with lag L=2 (as illustrated in FIG. 2), the random variable representing the noise pixel of interest may be expressed as a linear combination of previously synthesized pixels of a predefined neighborhood (in the example of FIG. 2, all previously synthesized pixels that are distant from the current pixel by two positions on the left and/or on the top of the current pixel) combined with a parameter corresponding to a Gaussian noise sample:

$$X_{i,j} = \varepsilon_{i,j} + \varphi_1 X_{i,j-1} + \varphi_2 X_{i,j-2} + \varphi_3 X_{i-1,j+2} + \varphi_4 X_{i-1,j+1} + \varphi_5 X_{i-1,j} + \varphi_6 X_{i-1,j-1} + \varphi_7 X_{i-1,j-2} + \varphi_8 X_{i-2,j+2} + \varphi_9 X_{i-2,j+1} + \varphi_{10} X_{i-2,j} + \varphi_{11} X_{i-2,j-1} + \varphi_{12} X_{i-2,j-2},$$

wherein $\varphi_1, \ldots, \varphi_P$ are the auto-regressive model linear combination parameters, and $\varepsilon_{i,j}$ a random number following an independent identically distributed gaussian distribution of standard deviation a.

The parameters of the AR model include the number P of linear combination coefficients ($\varphi_1, \varphi_2, \ldots, \varphi_P$), the linear combination coefficients ($\varphi_i, \varphi_2, \ldots, \varphi_P$), and the standard deviation a or variance of the Gaussian noise to be used for drawing the random number $\varepsilon_{i,j}$.

Based on these parameters, a current pixel value $X_{i,j}$ may be generated by adding a random value of a Gaussian noise of standard deviation a to a linear combination of the P pixel values previously generated for the P pixels in the causal neighborhood weighted by the linear combination coefficients ($\varphi_1, \varphi_2, \ldots \varphi_P$).

The grain synthesis algorithm specified for AV1 has been defined with computing efficiency in mind. The computing cost of synthesizing a full size grain image can indeed become high for processing an ultra HD image. As such, the AV1 specification for grain synthesis at the decoder does not require generating grain pixels for the full pixel size of the image (or video frame) under consideration. Instead, a noise pattern of a predetermined and smaller size than that of the image, e.g. 64×64 pixels, is generated, and used as a template for generating patches of a smaller size, such as 32×32 pixels. Each patches can be chosen at random coordinates in the 64×64 pixels template, and copied on the image which will have been previously divided into blocks of the same size as the patches (e.g. blocks of 32×32 pixels). FIG. 3 illustrates the selection of a patch (e.g. of size 32×32 pixels) at random coordinates in a grain template (e.g. of size 64×64 pixels).

Figure 4:
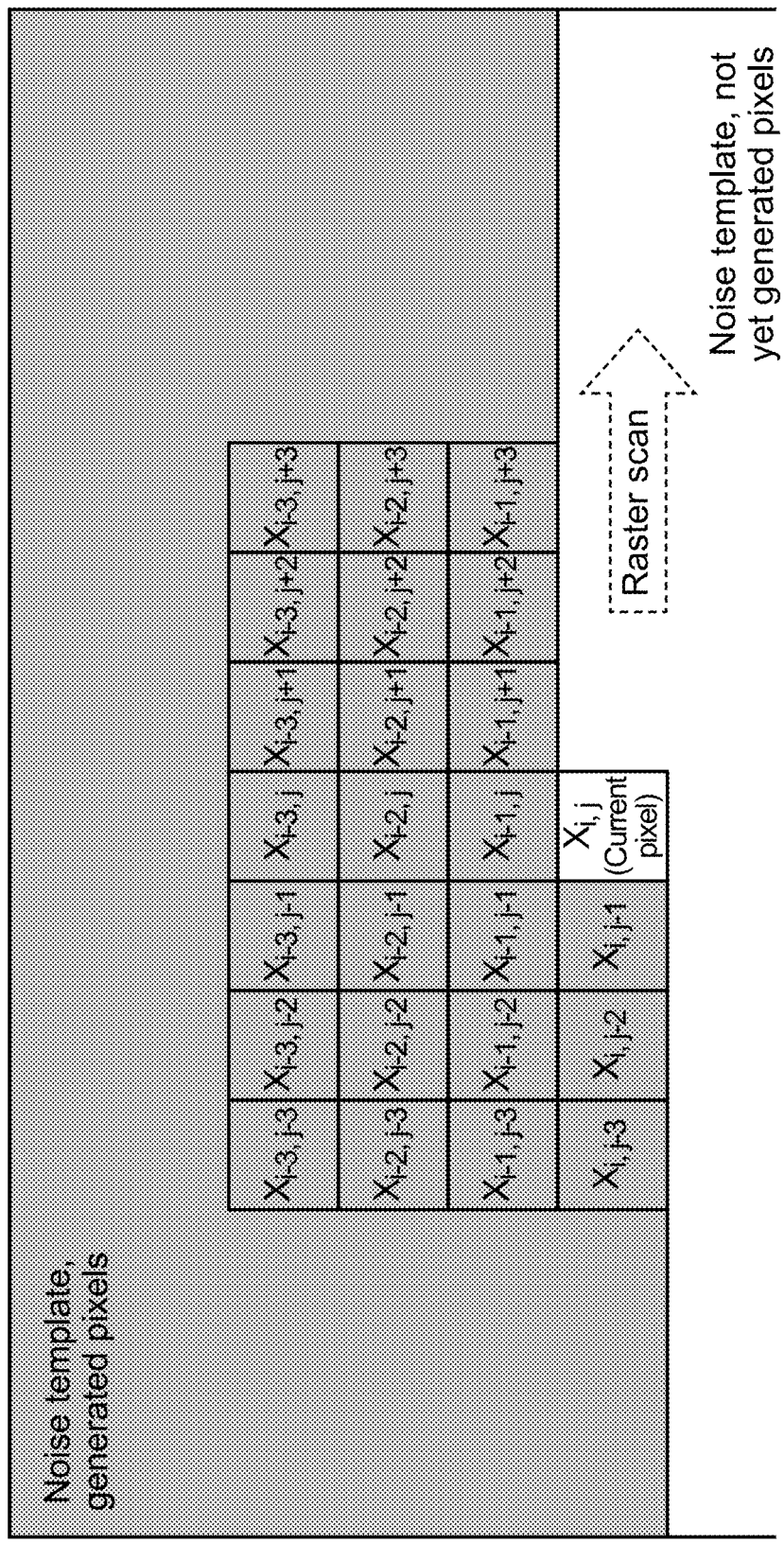
FIG. 4 illustrates an exemplary process of successively generating grain pixels in a template.

FIG. 4 illustrates an exemplary process of successively generating grain pixels in the template with the largest possible pixel neighborhood (corresponding to a lag L=3) for the autoregressive model, as defined by the AV1 specifications.

As illustrated on FIG. 4, a current noise pixel represented by a random variable $X_{i,j}$ may be computed according to a lag L=3 AR model based on the values of random variables of pixels in the neighborhood of the current pixel located in the array of noise pixels represented on FIG. 4 at a distance of up to 3 pixels from the current pixel.

A processing sequence for grain processing, at the encoder (analysis) or at the decoder (synthesis), the grain pixels of the image may define a sequence according to which grain pixels are analyzed/synthesized one after another. Because the pixels of the image may be analyzed at the encoder according to a predetermined sequence to determine the grain model parameters, the grain pixels may be synthesized at the decoder according to the same processing sequence. For example, a raster scan sequence may scan the pixels of the image starting from the pixel located at the leftmost upper corner of the image (represented by a pixel matrix), and progress to the pixel adjacent to the previously scanned pixel located to the right. At the end of a line of pixels, the sequence proceeds to the next line scanning the pixels from the left to the right. An image divided into blocks may be scanned in the same manner, with blocks being processed according to the processing sequence instead of pixels.

As discussed above, a noise template can therefore be progressively generated according to a processing sequence of grain analysis/synthesis, such as a raster scan sequence as illustrated on FIG. 4.

Further, the AV1 specifications provide that the grain parameters can be adjusted as a function of the luminance, to better model the behavior of actual film grain. For instance, film grain tends to be less prominent at high luminance, compared to medium luminance. AV1 allows specifying several luminance intervals and then send a scaling factor per luminance interval, from which a piecewise linear scaling function can be obtained. Although not specifically mentioned in the remaining of this document, the proposed methods, apparatuses and computer programs are compatible with this feature.

Image Analysis Methods

Although the above-described analysis/synthesis scheme provides a good solution to the grain compression problem, the synthesis algorithm defined in the AV1 specification has some drawbacks due to the use of the noise template based on which a grain image is generated by pixel copying of randomly selected patches.

According to the AV1 grain image synthesis scheme, 32×32 pixels grain patches are repeatedly selected in a 64×64 pixels grain template. The use of these patches selected from a template of synthesized grain pixels greatly reduces the computing cost of synthesizing the grain image, in particular when it comes to generating a grain image corresponding to an image with a large pixel number, such as an ultra HD image. However, the repeated selection of 32×32 pixel patches within a 64×64 template which is only twice as large, even though random, will lead to selected 32×32 pixel patches that tend to often contain the central portion of the 64×64 template. This may create structured pattern in the grain image which is generated from all the selected 32×32 patches. Even though it has been randomly generated, the noise template may include one or more structured patterns. Even though these structured patterns may not be very visible in the noise template, their repetitions in the final decoded image with synthesized noise will render them visible. As the repetition of a structured pattern in the reconstructed image at the decoder is easily identifiable by a human viewer, the generated noise may in some cases not have the expected visual quality, i.e. the "random feeling". Therefore the grain analysis/synthesis scheme specified in AV1 may introduce structured patterns in the grain image that may deteriorate the visual quality of the reconstructed image.

Figure 5:
FIG. 5 is an exemplary image which illustrates the structured aspect of the grain generated according to the method specified in the AV1 specification.
Figure 6:
FIG. 6 is an exemplary image processed in accordance with one or more embodiments.

An example of this visual deterioration is provided by FIGS. 5 and 6. While the example of FIG. 5 illustrates the structured aspect of the grain generated by the AV1 method, the example of FIG. 6 does not follow the AV1 method, and the visual aspect is much more pleasing.

The present subject disclosure provides image analysis methods that address this problem of structured patterns present in the grain of a decoded image, and aim at avoiding or limiting repetitive patterns appearance when using AV1 grain synthesis method.

Figure 7A:
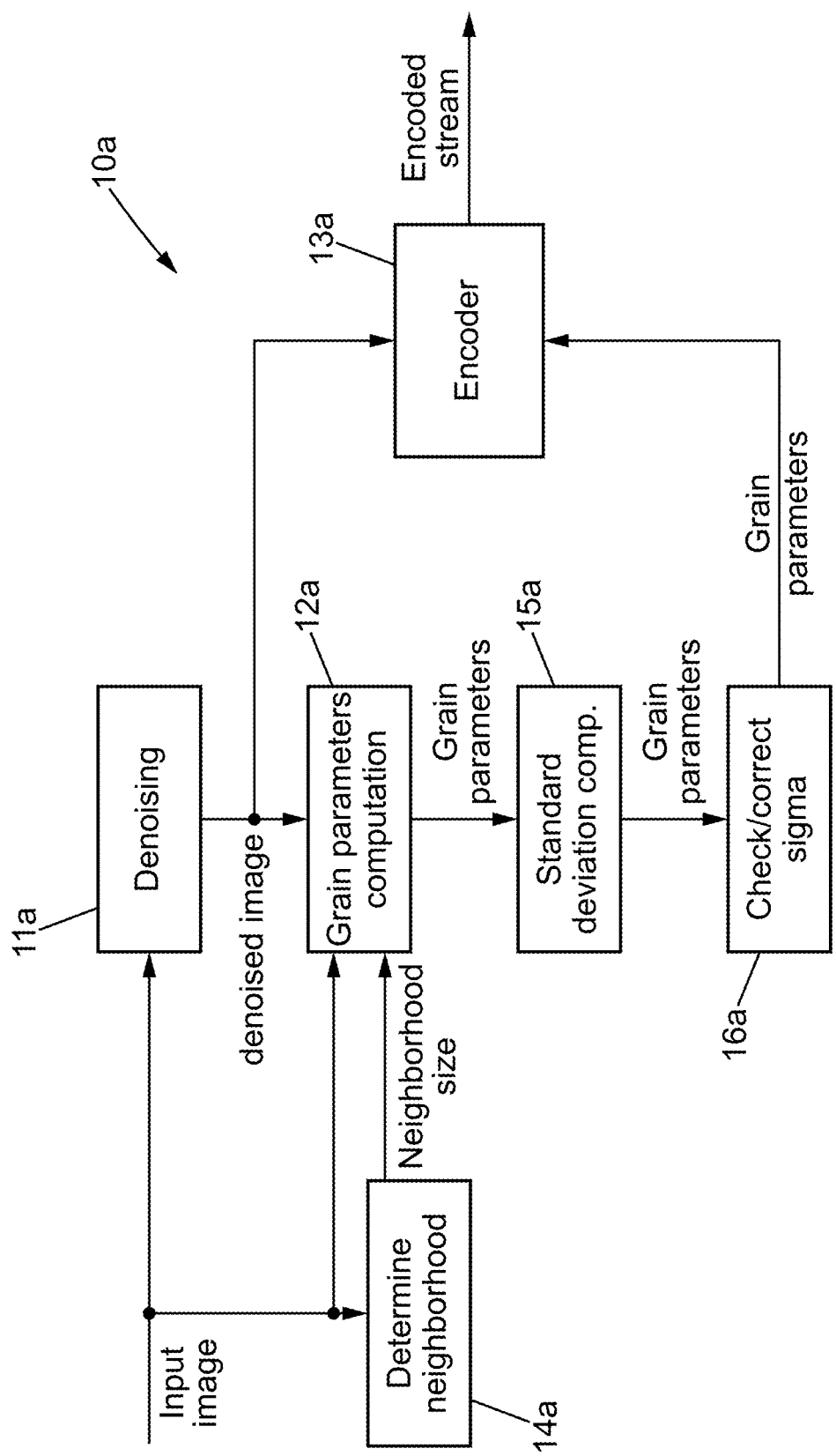
FIG. 7a is a block diagram illustrating an exemplary encoder in which the proposed image analysis methods may be implemented in accordance with one or more embodiments.

FIG. 7a shows an exemplary encoder 10a configured for implementing embodiments of the proposed image analysis method for improved grain synthesis according to the present subject disclosure.

As shown in FIG. 7a, the improved encoder 10a may comprise engines or functions that are similar to those comprised in the encoder 10 illustrated on FIG. 1: the encoder 10a may comprise a denoising engine 11a, a grain parameters computation engine 12a, and an encoder engine 14a which provide functions similar to those of the corresponding engines illustrated on FIG. 1. In addition, the encoder 10a may comprise a neighborhood determination engine 14a, a standard deviation computing engine 15a, and a check/correct sigma (standard deviation) engine 16a. The standard deviation computing engine 15a may be configured to receive grain parameters from the grain parameters computation engine 12a, and to synthesize, based on these grain parameters, a reference grain template of a predetermined size. The pixel size of the reference grain template generated by the standard deviation computing engine 15a may be preferably chosen identical to the size of the template generated at the decoder as part of generating the grain image, that is, for example for AV1, a size of 64×64 pixels. As discussed above, the grain parameters generated by the grain parameters computation engine 12a may include linear combination parameters ($\varphi_1, \varphi_2, \ldots, \varphi_P$) and noise variance (or, depending on the embodiment, standard deviation) parameter ($\sigma$) of an AR model, in which case the standard deviation computation engine 15a may be configured to synthesize the reference grain template based on the received linear combination parameters ($\varphi_1, \varphi_2, \varphi_P$), and the noise variance (or, depending on the embodiment, standard deviation) parameter ($\sigma$) of the AR model.

In some embodiments, the standard deviation computation engine 15a may further be configured to compute a variance (or, depending on the embodiment, standard deviation) ($\sigma_P$) based on the reference grain template.

In some embodiments, the linear combination parameters ($\varphi_1, \varphi_2, \ldots, \varphi_P$), noise variance (or, depending on the embodiment, standard deviation) parameter ($\sigma$) of the AR model, together with the computed variance (or, depending on the embodiment, standard deviation) ($\sigma_P$) may be transmitted by the standard deviation engine 15a to the check/correct sigma engine 16a, for further processing according to the proposed method.

The check/correct sigma engine 16a may be configured to check the received computed variance (or, depending on the embodiment, standard deviation) ($\rho_P$) by comparing it to a predefined threshold ($T_\sigma$). In some embodiments, in the case where the received computed variance (or, depending on the embodiment, standard deviation) ($\sigma_P$) is above the predefined threshold ($T_\sigma$) the corresponding noise variance (or, depending on the embodiment, standard deviation) parameter ($\sigma$) of the AR model may be modified in order to generate a lower variance.

The adjusted grain parameters may then be provided to the encoder, as described in relation to FIG. 1.

The size of the structured patterns that may be generated is related to the neighborhood of causal pixels used for the auto-regressive model. In particular, the larger the neighborhood, the larger the potential structures. In some embodiments, a neighborhood of pixels for synthesis of a current pixel $X_{is}$ of the reference grain template may be configured by setting one or more linear combination parameters ($\varphi_1, \varphi_2, \ldots, \varphi_P$) of the AR model to zero. In some embodiments, the presetting one or more linear combination parameters ($\varphi_1, \varphi_2, \ldots, \varphi_P$) of the AR model to zero can be performed a priori, that is, before the linear combination parameters ($\varphi_1, \varphi_2, \ldots, \varphi_P$) are estimated. In these embodiments, one or more linear combination parameters ($\varphi_1, \varphi_2, \ldots, \varphi_P$) of the AR model are set to zero before estimating these parameters, and only the remaining parameters may be estimated, thus using a smaller neighborhood.

In some embodiments, the neighborhood of causal pixels used for the auto-regressive model may be configured based on the resolution of the input image. This advantageously accounts for the fact that the perceivability of the structures is related to their spatial extent in the final decoded image. As the template and copied patches are of fixed sizes, 64×64 and 32×32 pixels respectively for AV1, their visual effect is dependent on the resolution of the image. The larger the resolution, the relatively smaller the structures.

Figure 7B:
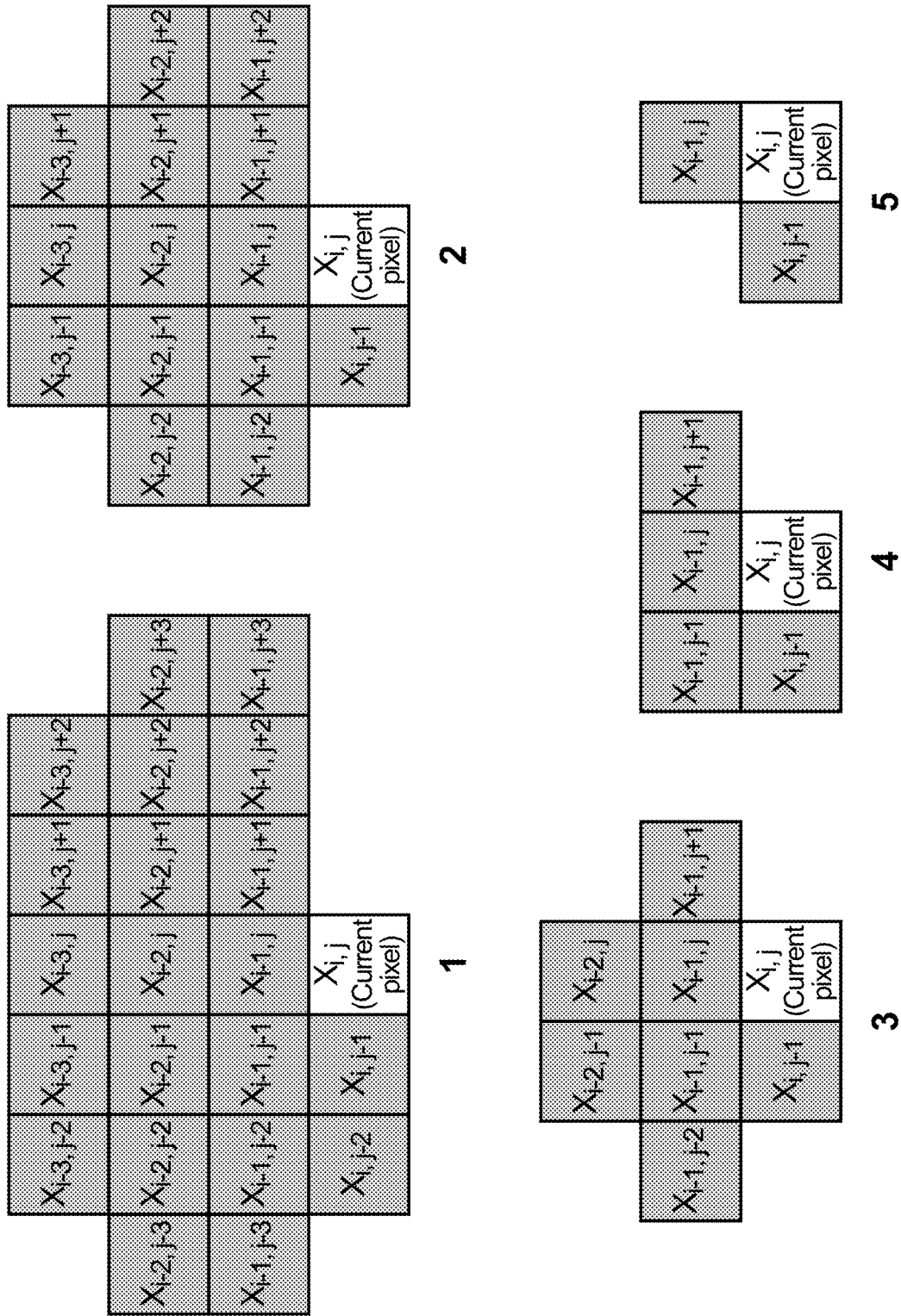
FIG. 7b illustrates an exemplary set of neighborhoods in accordance with one or more embodiments of the present subject disclosure.

In some embodiments, a relationship between resolution and neighborhood size may be predefined. FIG. 7b illustrates an exemplary set of neighborhoods that may be predefined and respectively associated with resolution ranges with respect to the input image. A look-up table such as the exemplary one below may define how to choose the neighborhood as a function of the resolution. In the following example, the resolution of the input image is identified through the corresponding image height:

| Input image resolution | Neighborhood # (as illustrated on FIG. 7b) |
| --- | --- |
| 2160 <= heigth | 1 |
| 1080 <= height < 2160 | 2 |
| 720 <= height < 1080 | 3 |
| 480 <= height < 720 | 4 |
| height < 480 | 5 |

Figure 7C:
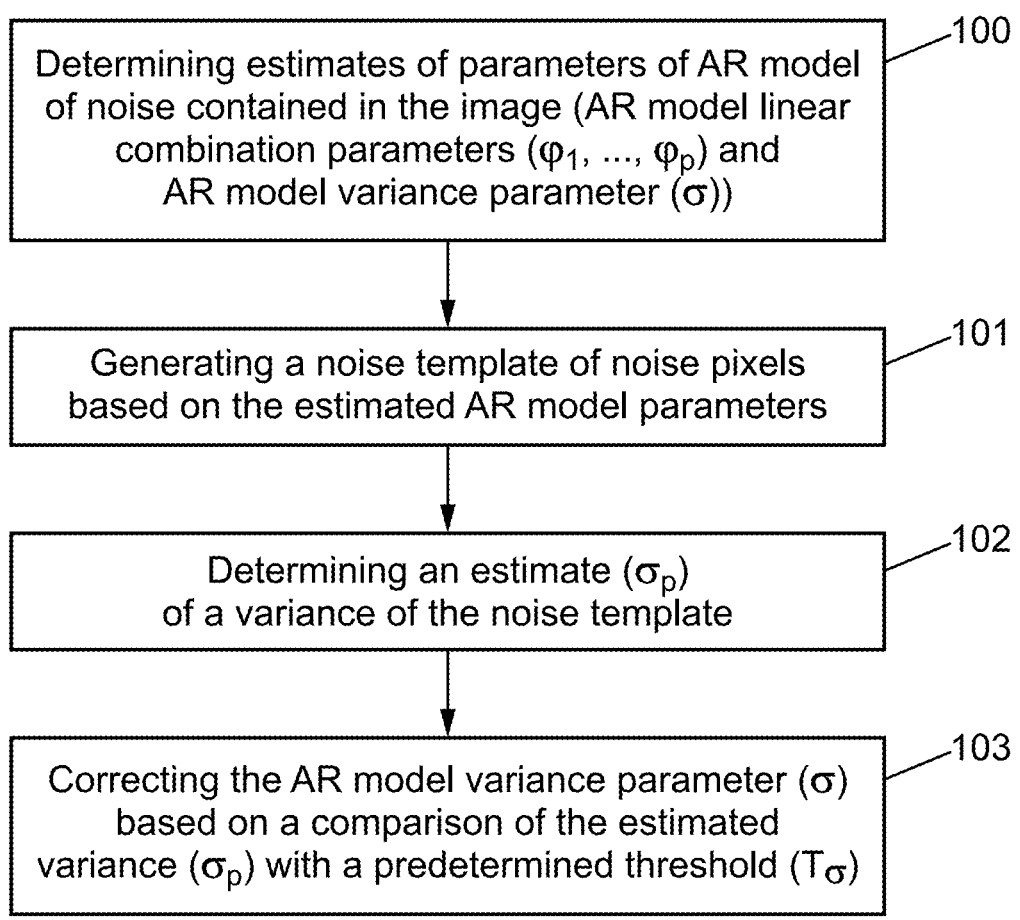
FIG. 7c illustrates an exemplary image analysis method according to one or more embodiments of the present subject disclosure.

FIG. 7c illustrates an exemplary grain analysis (pattern removal) method according to one or more embodiments of the present subject disclosure.

As shown on FIG. 7c, in some embodiments, estimates of parameters of an auto-regressive, AR, parametric model of noise contained in the image, according to which a current noise pixel is computed as a combination of a linear combination of P previous noise pixels in a causal neighborhood of the current noise pixel weighted by respective AR model linear combination parameters ($\varphi_1, \ldots, \varphi_P$) with a generated noise sample corresponding to an additive Gaussian noise of AR model variance parameter ($\sigma$) may first be determined (100). In some embodiments, a noise template of noise pixels may then be generated (101) based on the estimated AR model parameters. Preferably, the noise template may be chosen of a pixel size smaller than the pixel size of the input image. This allows determining (102) an estimate ($\sigma_P$) of a variance of the noise template, which is advantageous because the variance (or, depending on the embodiment, standard deviation) of the grain templates that will be generated using the estimated AR model parameters is not known a priori. Such variance (or, depending on the embodiment, standard deviation) ($\sigma_P$) will vary as a function of both the AR model linear combination parameters ($\varphi_1, \ldots, \varphi_P$) and the AR model variance parameter ($\sigma$), and will generally be different from the AR model variance parameter ($\sigma$).

Therefore, generating the noise template advantageously allows estimating the actual variance of the grain associated with the previously estimated AR model parameters. Preferably, the noise template may be generated (synthesized) in the same manner as used at the decoder side to generate a template for grain synthesis.

In some embodiments, a standard deviation of the noise template may be estimated, and the proposed methods may use standard deviation values instead of variance values.

Once an estimate of the variance (or, depending on the embodiment, standard deviation), depending on the embodiment, is determined, such estimated variance ($\sigma_P$) may be compared with a predetermined threshold ($T_\sigma$). Based on this comparison, the AR model variance parameter ($\sigma$) may be corrected (103).

In some embodiments, the estimated standard deviation ($\sigma_P$) is compared to the threshold ($T_\sigma$), and may be corrected accordingly. In some embodiments, if $\sigma_P > T_\sigma$, the AR model standard deviation parameter a may be corrected as $\sigma' = \sigma \times T_\sigma / \sigma_P$.

As the AR model variance parameter ($\sigma$) corresponds to the amplitude or the "strength" of the noise, with a strong noise corresponding to potential undesirable patterns to be generated when synthesizing the grain image at the decoder, the AR model variance parameter (σ) may advantageously be reduced in the case where it is larger than a predefined threshold.

In some embodiments, the AR model may be configured to model grain contained in the input image. Alternatively, the AR model may be chosen to model other type of noise present in the input image, such as sensor noise, in addition to or in place of film grain noise.

In some embodiments, the predetermined pixel size of the noise template may be chosen corresponding to the pixel size of a noise synthesis template used at a decoder to synthesize film grain based on the AR model using the AR model linear combination parameters and the corrected AR model variance parameter (σ).

Some embodiments may be directed to the AV1 video codec, in which case the predetermined pixel size of the noise template may be chosen to be 64 pixels×64 pixels.

In some embodiments, the predetermined threshold ($T_\sigma$) with which the estimated variance (or, depending on the embodiment, the estimated standard deviation) ($\sigma_P$) is compared may be chosen as a function of the image content bit-depth and/or the dynamic range of the image.

For example, in embodiments where an estimated standard deviation ($\sigma_P$) is compared with the estimated threshold ($T_\sigma$), and for an input image with a dynamic range corresponding to the standard dynamic range (SDR), the threshold (Ta) may be defined as follows: $T_\sigma=2^b/7$, where b is the image bit-depth, that is, the number of bits per pixel of the image. For an input image with a dynamic range corresponding to the high dynamic range (HDR), the threshold ($T_\sigma$) may be defined as follows: $T_\sigma=2^b/9$, where b is the image bit-depth, that is, the number of bits per pixel of the image.

In some embodiments, the correcting performed on the AR model variance parameter (σ) may correspond to a decrease of an amount proportional to a gap between the estimated variance ($\sigma_P$) and the predetermined threshold ($T_\sigma$). For example, the AR model variance parameter (σ) may be corrected as follows (if the estimated variance ($\sigma_P$) is larger than the predetermined threshold ($T_\sigma$)): $\sigma'=\sigma\times T_\sigma/\sigma_P$.

In some embodiments, the AR model variance parameter a may correspond to a standard deviation, the estimated variance $\sigma_P$ may correspond to a standard deviation, and upon determining that $\sigma_P>T_\sigma$, the AR model standard deviation parameter a may be corrected as $\sigma'=\sigma\times T_\sigma/\sigma_P$.

In some embodiments, at least one of the AR model linear combination parameters ($\varphi_1, \ldots, \varphi_P$) may be preset to zero. This advantageously allows configuring the neighborhood of causal pixels used for modeling the grain contained in the input image. In particular, it might be desirable to choose the size of such neighborhood in order to avoid larger structure patterns that may result from a large neighborhood. In some embodiments, the number of AR model linear combination parameters ($\varphi_1, \ldots, \varphi_P$) that are preset to zero may be chosen based on a pixel resolution of the image, for instance through a table mapping image resolutions with respective neighborhood sizes. Based on such a table, the size of the neighborhood used for analyzing and synthesizing the grain may be determined based on the resolution of the input image. In some embodiments, such table may define a mapping between resolution ranges and predefined neighborhood (defined by their size and shape), which may be pre-loaded into memory, that are identified in the table by an identification number.

Analysis Parameters Estimation Methods

Various methods have been developed for estimating the grain parameters when using an AR model for the grain, that is, estimating the AR model parameters (including the AR model linear combination parameters ($\varphi_1, \ldots, \varphi_P$) and AR model variance parameter (σ)). For example, the Yule-Walker method may be used, as this method is well suited for the estimation, its complexity is reasonable, and it usually provides satisfactory results.

However, the Yule-Walker method has been developed in the context of one-dimensional (1D) signals, so that its performance is well-known when implemented on 1D signals. Such is not the case for two-dimensional (2D) signals, which is the situation at hand when processing additive noise signals (such as grain) in images.

Mathematical proofs of convergence of the Yule-Walker method towards a solution have been proposed in the context of 1D signal processing. These methods cannot be directly transposed for 2D signal processing, so that the risk of divergence of the Yule-Walker method when used for estimating grain model parameters in an image needs to be taken into account.

For example, parameters estimated by the Yule-Walker method, although usable, may lead to the generation of a divergent grain pattern, that is, a grain pattern exhibiting continuously increasing oscillations and a standard deviation much higher than the standard deviation of the source grain.

It is desirable to avoid this situation of divergence in practical applications, as it might render the final decoded image completely saturated, which may amount to a complete loss of the image data.

Figure 8A:
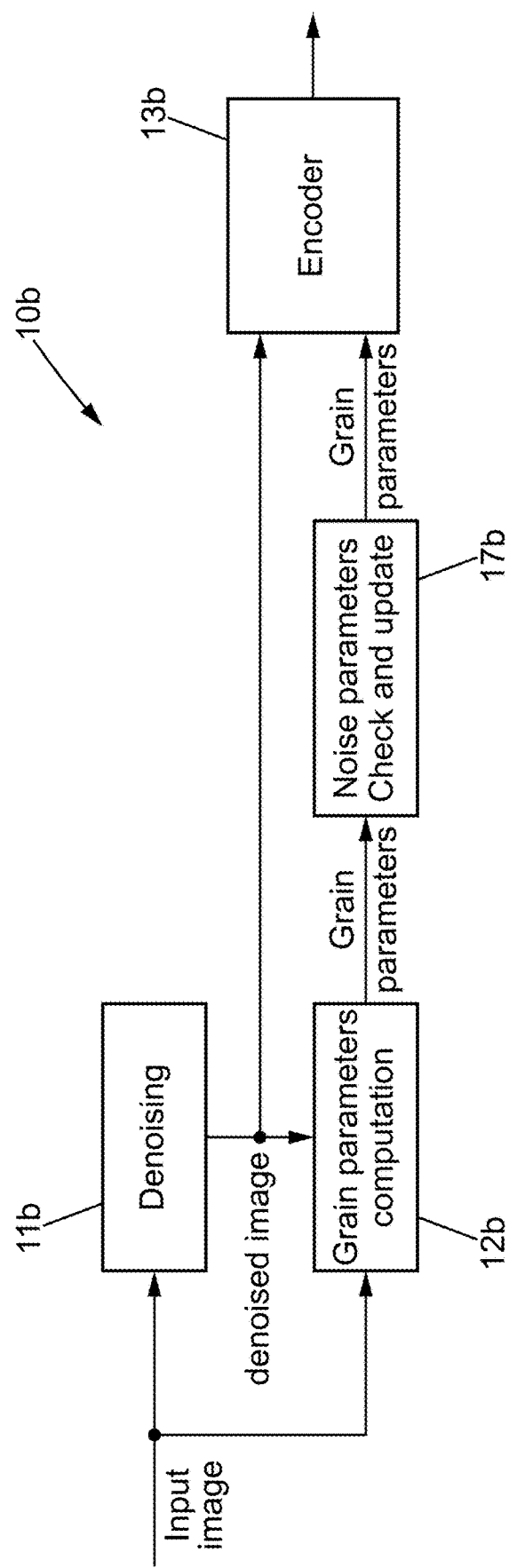
FIG. 8a is a block diagram illustrating an exemplary image encoder in which the proposed grain parameter estimation methods may be implemented in accordance with one or more embodiments.

In order to address this problem, the present subject disclosure provides an improved method of estimating analysis parameters (for the non-limiting example of grain analysis parameters) which can for example be implemented in the noise parameters check and update engine 17b of FIG. 8a.

FIG. 8a shows an exemplary encoder 10b configured for implementing embodiments of the proposed grain parameter estimation method for improved grain analysis according to the present subject disclosure.

As shown in FIG. 8a, the improved encoder 10b may comprise engines or functions that are similar to those comprised in the encoders 10 and 10a illustrated on FIGS. 1 and 7a: the encoder 10b may comprise a denoising engine 11b, a grain parameters computation engine 12b, and an encoder engine 13b which provide functions similar to those of the corresponding engines illustrated on FIG. 1. In addition, the encoder 10b may comprise a noise parameters check and update engine 17b. The noise parameters check and update engine 17b may be configured to receive grain parameters from the grain parameters computation engine 12b, and to synthesize, based on these grain parameters, a reference grain template of a predetermined size. The pixel size of the reference grain template generated by the noise parameters check and update engine 17b may be preferably chosen identical to the size of the template generated at the decoder as part of generating the grain image, that is, for example for AV1, a size of 64 pixels×64 pixels. As discussed above, the grain parameters generated by the grain parameters computation engine 12b may include linear combination parameters ($\varphi_i, \varphi_2, \ldots, \varphi_P$) and noise variance (or, depending on the embodiment, standard deviation) parameter (σ) of an AR model, in which case the noise parameters check and update engine 17b may be configured to synthesize the reference grain template based on the received linear combination parameters ($\varphi_1, \varphi_2, , \varphi_P$) and noise variance (or standard deviation) parameter ($\sigma$) of the AR model.

In some embodiments, the noise parameters check and update engine 17b may further be configured to compute a variance (or, depending on the embodiment, standard deviation) ($\sigma_P$) based on the reference grain template.

In some embodiments, the linear combination parameters ($\varphi_1, \varphi_2, \ldots, \varphi_P$), noise variance (or, depending on the embodiment, standard deviation) parameter ($\sigma$) of the AR model, together with the computed variance (or, depending on the embodiment, standard deviation) ($\sigma_P$) may be processed by the noise parameters check and update engine 17b according to the proposed grain (or noise) analysis method.

The value of the computed variance (or, depending on the embodiment, standard deviation) ($\sigma_P$) is expected to follow the source grain characteristics. In case of divergence, it is expected to be either close to 0 (full saturation), or very large (oscillations) as compared to the corresponding parameter ($\sigma$) of the AR model.

In order to detect these two possible cases, in some embodiments, the noise parameters check and update engine 17b may further be configured to check the value of the computed variance ($\sigma_P$) by comparing such value to the value of the noise variance parameter ($\sigma$) of the AR model. Indeed, while the value of $\sigma_P$ is not expected to be equal to that of a, it is expected to be in the same order of magnitude.

In some embodiments, the comparison of the value of the computed variance ($\sigma_P$) with the value of the noise variance parameter ($\sigma$) of the AR model may be performed by defining two thresholds, a minimum threshold ($T_{min}$) and a maximum threshold ($T_{max}$), based on the value of the noise variance parameter ($\sigma$) of the AR model, and correcting the value of some of the estimated AR model parameters if such value is beyond either threshold.

Said otherwise, the noise parameters check and update engine 17b may further be configured to determine that the value of the computed variance ($\sigma_P$) is valid, that is, that divergence of the grain parameter estimates computation process did not occur, if the value of the computed variance ($\sigma_P$) is between the minimum threshold and the maximum threshold. Said otherwise, divergence is not detected if the computed variance ($\sigma_P$) fulfills the condition: $T_{min} < \sigma_P < T_{max}$.

In one or more embodiments, the minimum threshold ($T_{min}$) and maximum threshold ($T_{max}$) may be defined as a linear function of the value of the noise variance parameter ($\sigma$) of the AR model. For example, the minimum threshold may be defined as: $T_{min} = \sigma/K_{min}$, where $K_{min}$ is a constant, for example chosen equal to 2. The maximum threshold may be defined as: $T_{max} = \sigma \cdot K_{max}$, where $K_{max}$ is a constant, for example chosen equal to 2. In some embodiments, the $K_{min}$ and $K_{max}$ constants may be chosen equal.

Otherwise, if divergence is detected, the noise parameters check and update engine 17b may in some embodiments further be configured to apply a correction to the estimates of the linear combination parameters ($\varphi_1, \varphi_2, \ldots, \varphi_P$) of the AR model. In some embodiments, the noise variance parameter ($\sigma$) of the AR model may be left unchanged, as oscillations may be considered as resulting mainly from the values of the $\varphi_i, \ldots, \varphi_P$ parameters, in contrast to the noise variance parameter ($\sigma$).

In some embodiments, the linear combination parameters ($\varphi_1, \varphi_2, \ldots, \varphi_P$) of the AR model may be corrected by dividing one or more of the linear combination parameters ($\varphi_1, \varphi_2, \ldots, \varphi_P$) by a predefined constant, $K_\varphi$. In some embodiments, the linear combination parameters ($\varphi_1, \varphi_2, \ldots, \varphi_P$) of the AR model may all be divided by the predefined constant $K_\varphi$. For example, the predefined constant $K_\varphi$ may be chosen in the interval [1; 2], for example equal to 1.4.

In one or more embodiments, the noise parameters check and update engine 17b may be configured to perform at least one iteration of a convergence loop. Each iteration of the convergence loop may comprise the above-described operations performed by the noise parameters check and update engine 17b, based on the grain parameters received from the grain parameters computation engine 12b: synthesize, based on the received grain parameters (including linear combination parameters ($\varphi_1, \varphi_2, \ldots, \varphi_P$) and noise variance (or, depending on the embodiment, standard deviation) parameter ($\sigma$) of the AR model), a reference grain template of a predetermined size, compute a variance (or, depending on the embodiment, a standard deviation) ($\sigma_P$) based on the synthesized reference grain template, detect potential divergence by comparing the value of the computed variance (or, depending on the embodiment, standard deviation) ($\sigma_P$) with the corresponding parameter ($\sigma$) of the AR model, and if divergence is detected apply a correction to the estimates of the linear combination parameters ($\varphi_1, \varphi_2, \ldots, \varphi_P$) of the AR model, otherwise exiting the convergence loop.

In some embodiments, iterations of the convergence loop may be performed until convergence is reached, that is, until divergence is no longer detected during the current loop iteration. It can be expected that only few iterations will be needed before convergence is reached if divergence is detected, and the proposed correction of the estimates of the linear combination parameters ($\varphi_1, \varphi_2, \ldots, \varphi_P$) of the AR model in some embodiments will bring the values of these parameters closer to 0, where divergence can no longer occur.

Figure 8B:
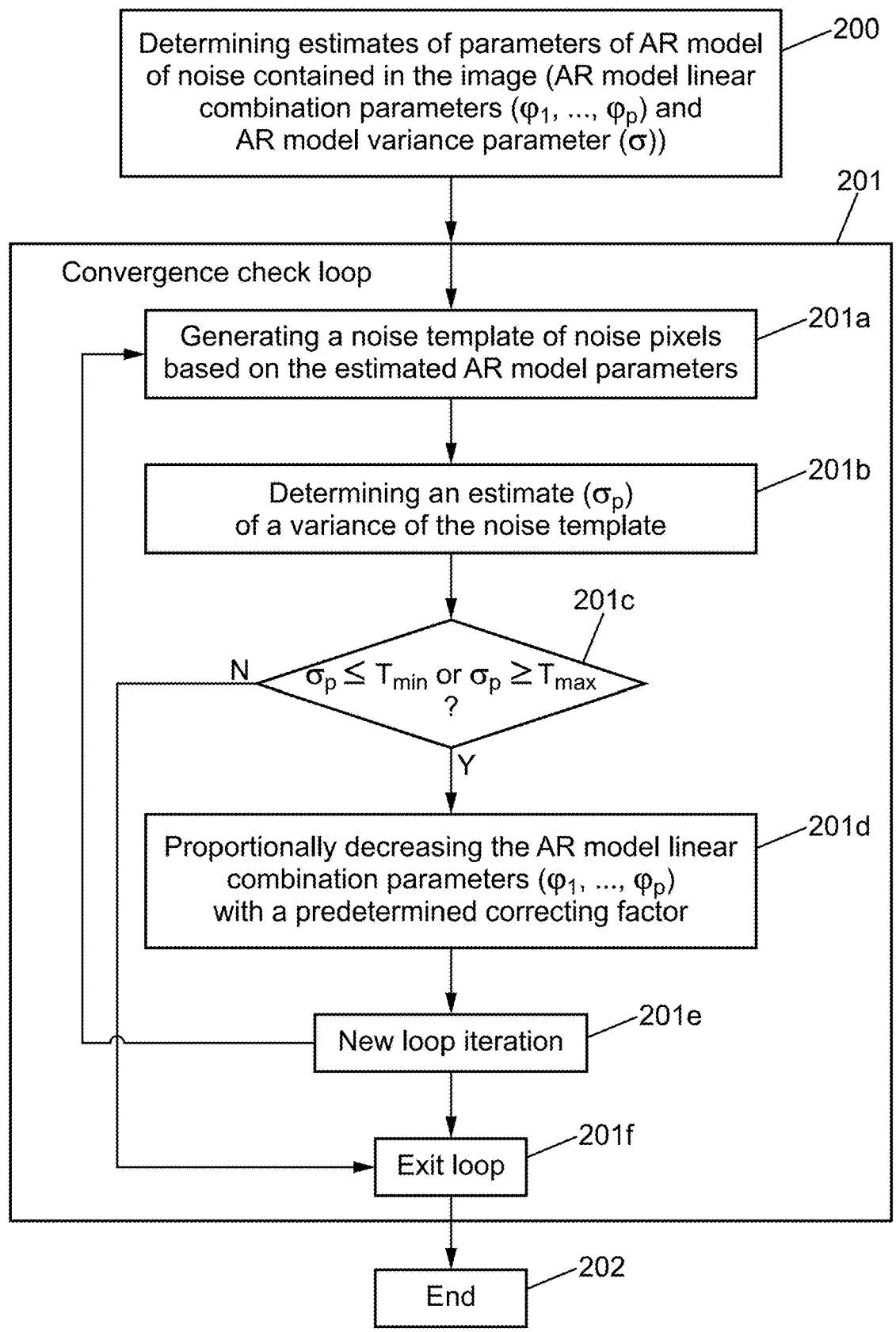
FIG. 8b illustrates an exemplary grain parameter estimation method according to one or more embodiments of the present subject disclosure.

FIG. 8b illustrates an exemplary grain parameters estimation method according to one or more embodiments of the present subject disclosure.

As shown on FIG. 8b, in some embodiments, estimates of parameters of an auto-regressive, AR, parametric model of noise contained in the image, according to which a current noise pixel is computed as a combination of a linear combination of P previous noise pixels in a causal neighborhood of the current noise pixel weighted by respective AR model linear combination parameters ($\varphi_1, \ldots, \varphi_P$) with a generated noise sample corresponding to an additive Gaussian noise of AR model variance parameter ($\sigma$) may first be determined (200).

A convergence check loop may then be performed (201), with each iteration of the convergence check loop comprising in some embodiments the following operations:

In some embodiments, an iteration of the convergence check loop may start with generating (201a) a noise template of noise pixels based on the estimated AR model parameters. Preferably, the noise template may be chosen of a pixel size smaller than the pixel size of the input image. This allows determining (201b) an estimate ($\varphi_P$) of a variance of the noise template, which is advantageous because the variance (or, depending on the embodiment, standard deviation) of the grain templates that will be generated using the estimated AR model parameters is not known a priori. Such variance (or, depending on the embodiment, standard deviation) ($\varphi_P$) will vary as a function of both the AR model linear combination parameters ($\varphi_1, \ldots, \varphi_P$) and the AR model variance parameter ($\sigma$), and will generally be different from the AR model variance parameter ($\sigma$).

In some embodiments, an iteration of the loop may comprise determining (201c) whether the estimated variance ($\varphi_P$) is below a first predetermined threshold ($T_{min}$) or above a second predetermined threshold ($T_{max}$).

In the case where the estimated variance ($\varphi_P$) is below the first predetermined threshold ($T_{min}$) or above the second predetermined threshold ($T_{max}$), one or more of the AR model linear combination parameters ($\varphi_1, \ldots, \varphi_P$) may be proportionally decreased with a predetermined correcting factor (201d), and a new iteration of the convergence check loop may be performed.

In the case where the estimated variance ($\varphi_P$) is neither below the first predetermined threshold ($T_{min}$) nor above the second predetermined threshold ($T_{max}$), the convergence check loop may be exited (201f) at which point the proposed process may end (202).

Preferably, the noise template may be generated (synthesized) in the same manner as used at the decoder side to generate a template for grain synthesis.

In some embodiments, a standard deviation of the noise template may be estimated, and the proposed methods may use standard deviation values instead of variance values.

In some embodiments, the AR model may be configured to model grain contained in the input image. Alternatively, the AR model may be chosen to model other type of noise present in the input image, such as sensor noise, in addition to or in place of film grain noise.

In some embodiments, the predetermined pixel size of the noise template may be chosen corresponding to the pixel size of a noise synthesis template used at a decoder to synthesize film grain based on the AR model using the AR model linear combination parameters and the corrected AR model variance parameter ($\sigma$).

Some embodiments may be directed to the AV1 video codec, in which case the predetermined pixel size of the noise template may be chosen to be 64 pixels×64 pixels. In some embodiments, the proportionally decreasing one or more the AR model linear combination parameters ($\varphi_1, \ldots, \varphi_P$) with the predetermined correcting factor may comprise dividing each of the AR model linear combination parameters ($\varphi_1, \ldots, \varphi_P$) by the predetermined correcting factor, the predetermined correcting factor being greater than 1. For example, the predetermined correcting factor may be chosen smaller than 2, for example equal to 1.4. In some embodiments, the first predetermined threshold $T_{min}$) and/or the second predetermined threshold ($T_{max}$) may be defined based on the additive Gaussian noise of AR model variance parameter ($\sigma$).

In some embodiments, the first predetermined threshold $T_{min}$) may be defined as comprising the additive Gaussian noise of AR model variance parameter ($\sigma$) divided by a first predetermined scaling factor ($K_{min}$).

In some embodiments, the second predetermined threshold ($T_{max}$) may be defined as comprising the additive Gaussian noise of AR model variance parameter ($\sigma$) multiplied by a second predetermined scaling factor ($K_{max}$).

In some embodiments, at least one of the AR model linear combination parameters ($\varphi_1, \ldots, \varphi_P$) may be preset to zero. This advantageously allows configuring the neighborhood of causal pixels used for modeling the grain contained in the input image. In particular, it might be desirable to choose the size of such neighborhood in order to avoid larger structure patterns that may result from a large neighborhood. In some embodiments, the number of AR model linear combination parameters ($\varphi_1, \ldots, \varphi_P$) that are preset to zero may be chosen based on a pixel resolution of the image, for instance through a table mapping image resolutions with respective neighborhood sizes. Based on such a table, the size of the neighborhood used for analyzing and synthesizing the grain may be determined based on the resolution of the input image. In some embodiments, such table may define a mapping between resolution ranges and predefined neighborhood (defined by their size and shape), which may be pre-loaded into memory, that are identified in the table by an identification number.

Video Analysis Methods

The film grain analysis scheme that has been considered for the AV1 video codec is defined on a per image basis. However, as the grain parameters are estimated for frames (images) of an input video, the estimation error that may be generated for each frame may change from frame to frame, thereby creating a temporal instability of the grain aspect once synthesized, and resulting in a less visually satisfying result of the grain synthesis.

It is therefore desirable to improve the temporal stability of the grain aspect for visually enhancing the result of the grain analysis/synthesis scheme for a user. On the other hand, one must not prevent fast adaptation to video temporal events such as scene cuts.

The present subject disclosure therefore also provides an improved video grain analysis scheme, that is, an improved scheme for analyzing grain in a video sequence, which aims at improving the temporal stability of the grain parameters, adapting to the sequence temporal structure, and providing a more reliable grain parameter estimation.

Figure 9A:
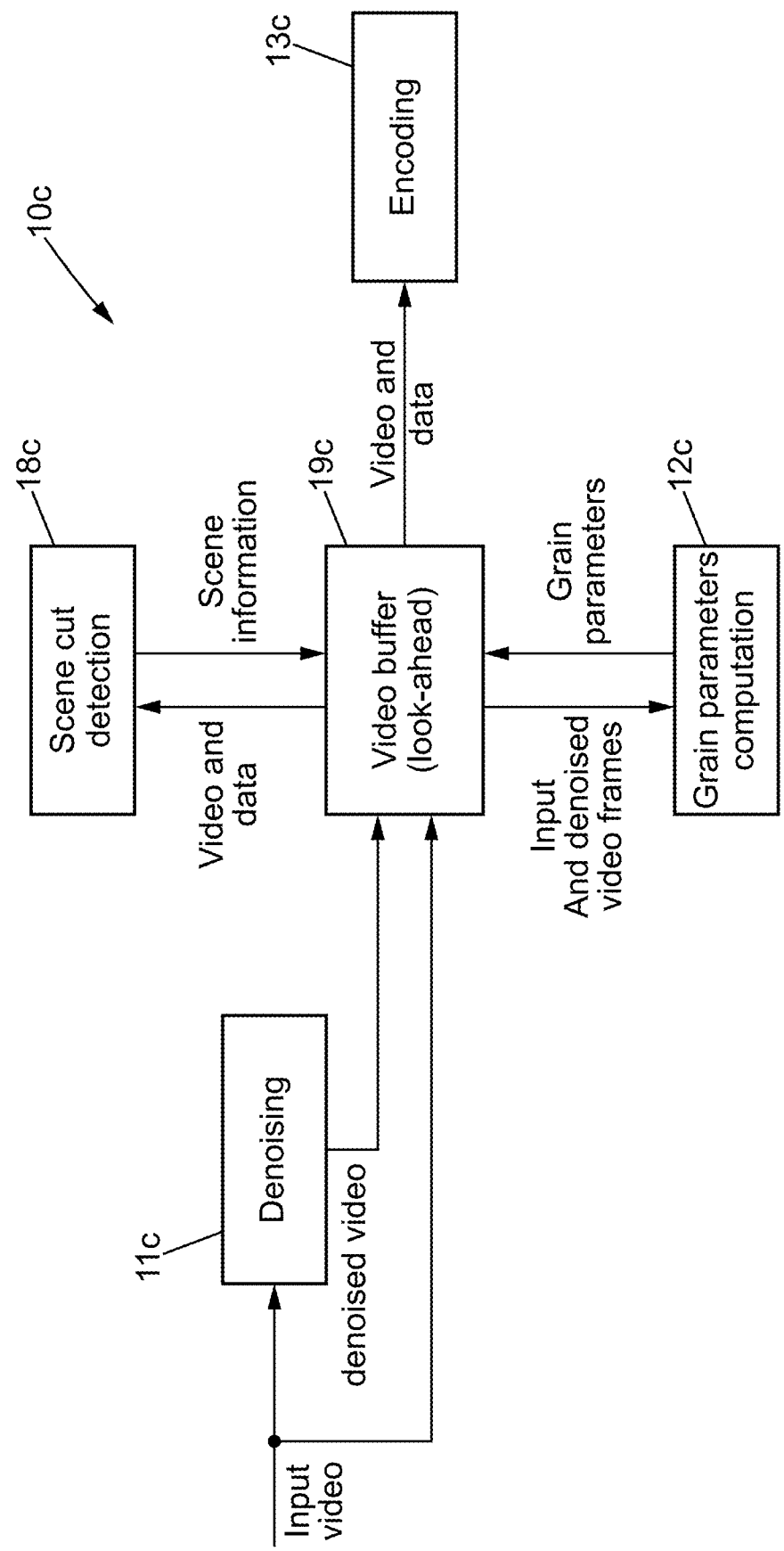
FIG. 9a is a block diagram illustrating an exemplary video encoder in which the proposed video analysis methods may be implemented in accordance with one or more embodiments.

FIG. 9a shows an exemplary encoder 10c configured for implementing embodiments of the proposed video analysis method according to the present subject disclosure.

As shown in FIG. 9a, the improved encoder 10c may comprise engines or functions that are similar to those comprised in the encoders 10, 10a, and 10b illustrated on FIGS. 1, 7a, and 8a: the encoder 10c may comprise a denoising engine 11c, a grain parameters computation engine 12c, and an encoder engine 13c which provide functions similar to those of the corresponding engines illustrated on FIG. 1. In addition, the encoder 10c may comprise a scene cut detection engine 18c and a video buffer engine 19c.

The video buffer engine 19c may be configured in some embodiments to store in a video buffer, for example managed as a First-In-First-Out (FIFO) memory buffer, source frames of the input video and corresponding denoised frames output by the denoising engine 11c. The video buffer engine 19c may comprise a FIFO buffer such as used in video encoder design and typically referred to as "look-ahead" buffer. This buffer advantageously allows implementing video processing and analyzing tasks, prior to encoding in the encoding engine (13c).

According to embodiments of the proposed video analysis method, the grain parameters may be estimated on a sequence of images, rather than on a single image.

In some embodiments, an input video sequence may be divided into a sequence of consecutive subsets, also referred to as chunks. Each chunk may be a set of one or more (N) consecutive images of the input video sequence.

In addition, analysis windows may be defined, each as a set of one or more (M) images of the input video sequence. The images of an analysis window may not be successive images in the input video sequence. In some embodiments, two consecutive analysis window may overlap with each other.

The analysis window may be used for grain parameters estimation, and the chunks may determine sets of images which will share the same grain parameters, for example the same linear combination parameters ($\varphi_1, \varphi_2, \ldots, \varphi_P$) and noise variance (or, depending on the embodiment, standard deviation) parameter (σ) of the AR model.

Figure 9B:
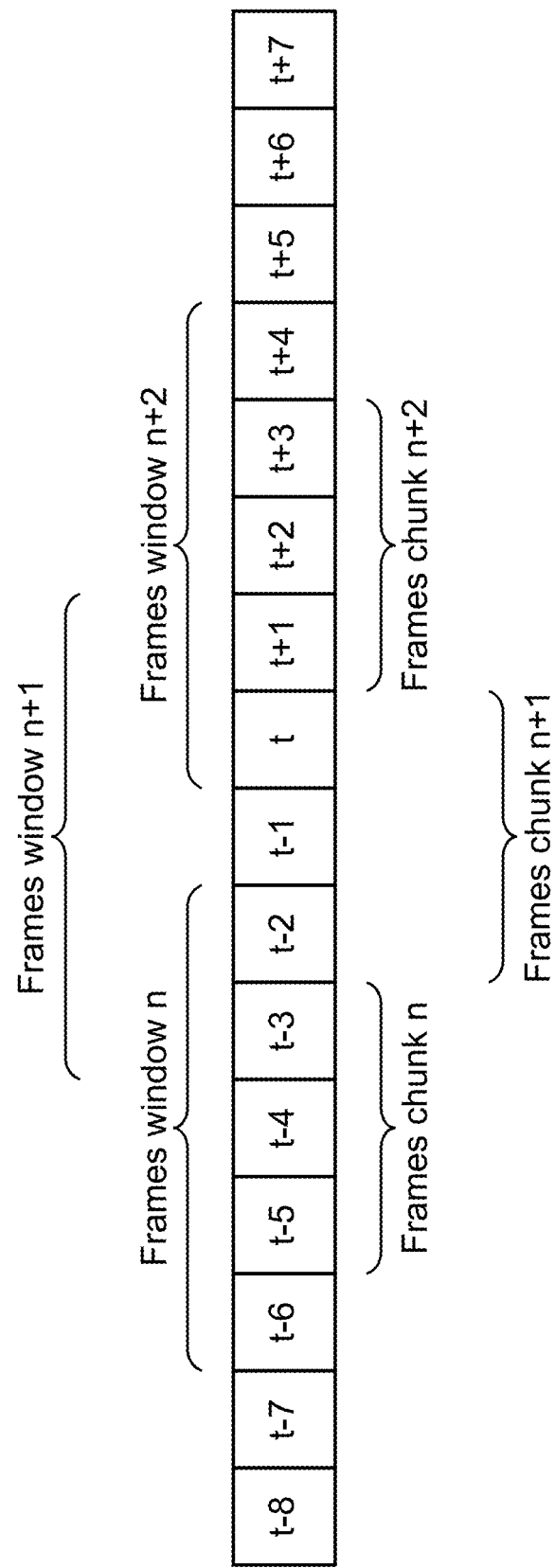
FIGS. 9b and 9c show an exemplary input video sequences in which chunks and analysis windows have been defined according to one or more embodiments.

FIG. 9b shows an exemplary input video sequence in which chunks and analysis windows have been defined according to one or more embodiments.

In the example illustrated on FIG. 9b, the number N of images per chunk is equal to 3, and each analysis window is a set of M=5 successive frames (images) of the input video sequence. For example, an analysis window #n is composed of frames t−6 to t−2, while a chunk #n is composed of frames t−5 to t−3. The 5 frames of the analysis window #n are used to estimate the grain parameters that will be applied on the 3 frames of the chunk #n. Likewise, the 5 frames of the analysis window #n+1 are used to estimate the grain parameters that will be applied on the 3 frames of the chunk #n+1. As illustrated in FIG. 9b, in some embodiments the chunks and analysis windows may be chosen so that there is a one-to-one mapping between the chunk and the analysis window. In some embodiments, the chunks and analysis windows may further be chosen so that the images of a chunk are all included into the corresponding analysis window. For example, in some embodiments an analysis window #k may correspond in a one-to-one correspondence to a chunk #k, and the M successive images (frames) of an analysis window #k may be used to estimate grain parameters that will be commonly applied to the images of the corresponding chunk #k. That is, the grain parameters (linear combination parameters ($\varphi_1$, $\varphi_2$, . . . , $\varphi_P$) and noise variance parameter (σ) of the AR model) determined based on the image of the analysis window #k may be used for each image of the corresponding chunk #k.

As illustrated on FIG. 9b, the number M of images in an analysis window may be greater than the number N of images in a corresponding chunk. In some embodiments, each analysis window may be defined with a common number M of images, which may be greater than the common number N of images defined for each chunk.

Defining M and N so that M>N, and choosing analysis windows that overlap have several benefits: As the successive chunks share a part of the data used for grain parameters estimation, it favors temporal stability. In addition, as there is more data available for estimating a single set of grain parameters, the estimation is statistically more robust. In some embodiments, estimating the grain parameters using single frames may be straightforward, as it may be achieved through the concatenation of the estimation data extracted from each considered frame as described above.

In other embodiments, the parameters M and N may be defined so that M<N. Choosing M smaller than N advantageously reduces the estimation complexity.

Therefore the present subject disclosure provides a way to determine a trade-off between complexity and robustness, thus allowing adaptation to any use-case.

In practical applications, the grain parameters may change abruptly due to some specific video events. For example, the input video may include a scene cut between a grainy movie scene and a non-grainy advertisement. The following description focuses on the non-limiting exemplary video event of the scene cut. However, a person of ordinary skill in the art will understand that the embodiments of the proposed method can be used for various types of video events, such as cross-fades, flashes or graphics insertion, and that the proposed method is not limited to scene cut events, which are provided only as an example.

A cross-fade is a smooth transition between two scenes. During a cross-fade, each frame is a weighted average of frames of the two successive scenes. The weights change during the cross-fade following for example a S-curve. For video processing, one may separate the video as the scene before the cross-fade, the cross-fade itself and the scene after the cross-fade.

A flash is a sudden and short event that modifies significantly the characteristics of a small number of video frames in a scene. For example, if a photography flash is triggered during the capture of a video scene, a single frame in the scene will be much brighter than the others. The capture noise characteristics on this frame will be different from the capture noise characteristics of the other frames of the scene. Therefore, as for a scene cut, the chunks and analysis windows can be arranged to not cross the flash boundaries.

In TV programs, it is very common to associate synthetic graphics to natural video contents. For example, a news report may start with natural content of a scene with capture noise, then a pie chart may be overlay on half of the frame. As the graphics are synthetic, they contain no capture noise. Therefore, when a graphic appear on a natural content, the grain model must be adapted instantaneously.

In some embodiments, a scene-cut detection may be performed prior to grain parameters estimation. In the event of a scene cut, the chunks and windows may be adjusted locally such that they do not cross the scene cut. Generally speaking, chunks and windows may be adjusted so that they do not cross abrupt video events.

Figure 9C:
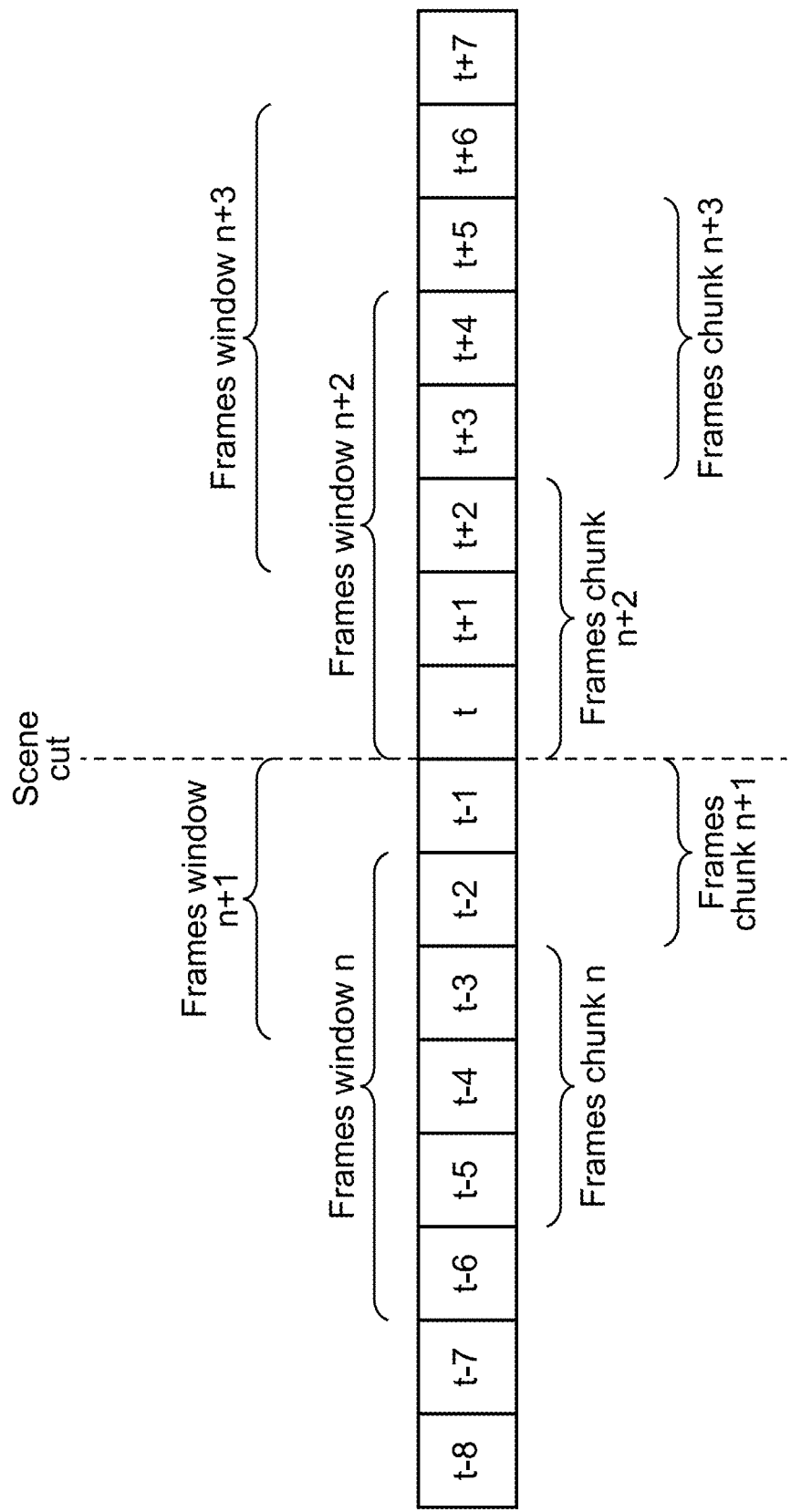

FIG. 9c shows another exemplary input video sequence in which chunks and analysis windows have been defined according to one or more embodiments.

In the embodiment illustrated by the example of FIG. 9c, the analysis window and chunk sizes have been modified around the video event (in the illustrated example, a scene cut) in order to avoid having an analysis window or a chunk cross the scene cut.

Even though according to some embodiments the same grain model parameters may be used for several successive frames, the codec syntax may impose sending explicitly the parameters for each frame. In the case of AV1, the parameters send for each frame may include the seed of the pseudo-random generator. To guarantee a visually pleasing result, it is advantageous to send different seeds for successive frames. As a consequence, even though some of the grain model parameters generated by the encoder and provided to the decoder may be identical for successive frames of a chunk, not all the parameters provided by the encoder to the decoder may be identical for a chunk.

As illustrated on FIG. 9c, the frames windows n+1 and n+2 may be shortened so as to not include a frame which is beyond the detected scene cut from the frame window standpoint: frames with time labels t and t+1 are removed from the frames window n+1, and the frame with time label t−1 is removed from the frames window n+2. As shown on FIGS. 9b and 9c, from the standard configuration of chunks shown on FIG. 9b, only the chunk n+1 may need to be shortened so as to not include the frame with time label t which otherwise would make the frames chunk n+1 go over the detected scene cut.

Figure 9D:
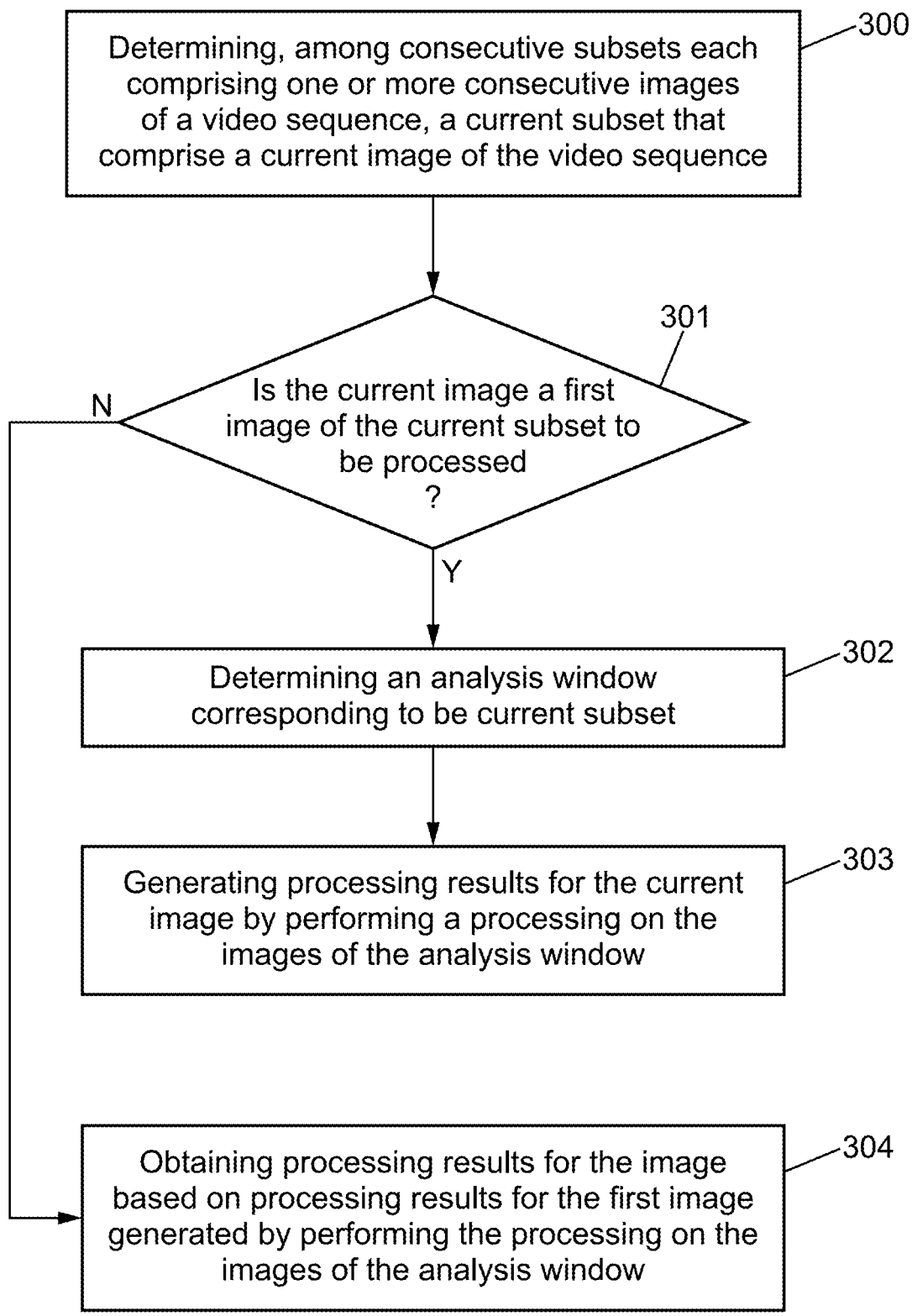
FIG. 9d illustrates an exemplary video analysis method according to one or more embodiments of the present subject disclosure.

FIG. 9d illustrates an exemplary video analysis method according to one or more embodiments of the present subject disclosure.

In embodiments of the proposed video analysis method of processing an image of a video sequence comprising a plurality of images, a current subset that comprises the image may be determined (300) among the consecutive subsets of a sequence of consecutive subsets that divides the video sequence.

A determination (301) may then be made as to whether the image is a first image of the current subset to be processed.

Upon determining that the image is the first image to be processed in the current subset, an analysis window comprising a plurality of consecutive images of the video sequence, comprising at least one image of the current subset, and corresponding to the current subset may be determined (302).

Processing results for the image may then be generated (303) by performing a processing on the images of the analysis window.

In the case where the above determination (301) leads to determining that the image is not the first image to be processed in the current subset, the processing results for the image may be obtained (304) based on processing results for the first image, which results were generated by performing the processing on the images of the analysis window.

As a consequence, in the case where the current image is the first image of the subset (the chunk) to be processed, the processing may be performed on the images of the analysis window and processing results may be generated for all the images of the subset. Otherwise, in the case where the current image is not the first image of the subset to be processed, the images of the analysis window will have already been processed, and the processing results for the current image will be obtained based on the results of the processing of the images of the analysis window performed for the first image of the subset to be processed.

The proposed method may be implemented for various types of processing, such as for example the grain processing of images of a video sequence.

Another example of processing to which the proposed method may be applied is tone-mapping. Tone-mapping can be described is a technique used in image processing and computer graphics to map one set of colors to another to approximate the appearance of high-dynamic-range images in a medium that has a more limited dynamic range. For example tone-mapping may be used to convert an image or a frame of a video sequence from HDR dynamic range to SDR dynamic range. When mapping HDR to SDR, one may adapt to the local scene illumination characteristics. Therefore the same tone-mapping parameters computed on an analysis window can be applied on a per-chunk level.

In some embodiments, the mapping function that maps HDR luminance levels to SDR luminance levels may be defined to operate on a per-chunk level according to embodiments of the proposed video processing method.

For example, in some embodiments, the processing may comprise determining estimates of parameters of an autoregressive, AR, parametric model of noise contained in the images of the analysis window, according to which a current noise pixel may be computed as a combination of a linear combination of P previous noise pixels in a causal neighborhood of the current noise pixel weighted by respective AR model linear combination parameters $(\varphi_1, \ldots, \varphi_P)$ with a generated noise sample corresponding to an additive Gaussian noise of AR model variance parameter $(\sigma)$. In some embodiments, the AR model may be configured to model grain contained in the current image.

In some embodiments, the proposed method may further comprise: detecting a video event occurring between two consecutive images of the video sequence, and adjusting an analysis window which contains the two consecutive images so that the analysis window no longer contains the two consecutive images.

In some embodiments, the proposed method may further comprise: detecting a video event occurring between two consecutive images of the video sequence, and adjusting a subset which contains the two consecutive images so that the subset no longer contains the two consecutive images.

Depending on the embodiment, the video event may be a scene cut, a cross-fade, a flash or a graphics insertion.

Figure 10:
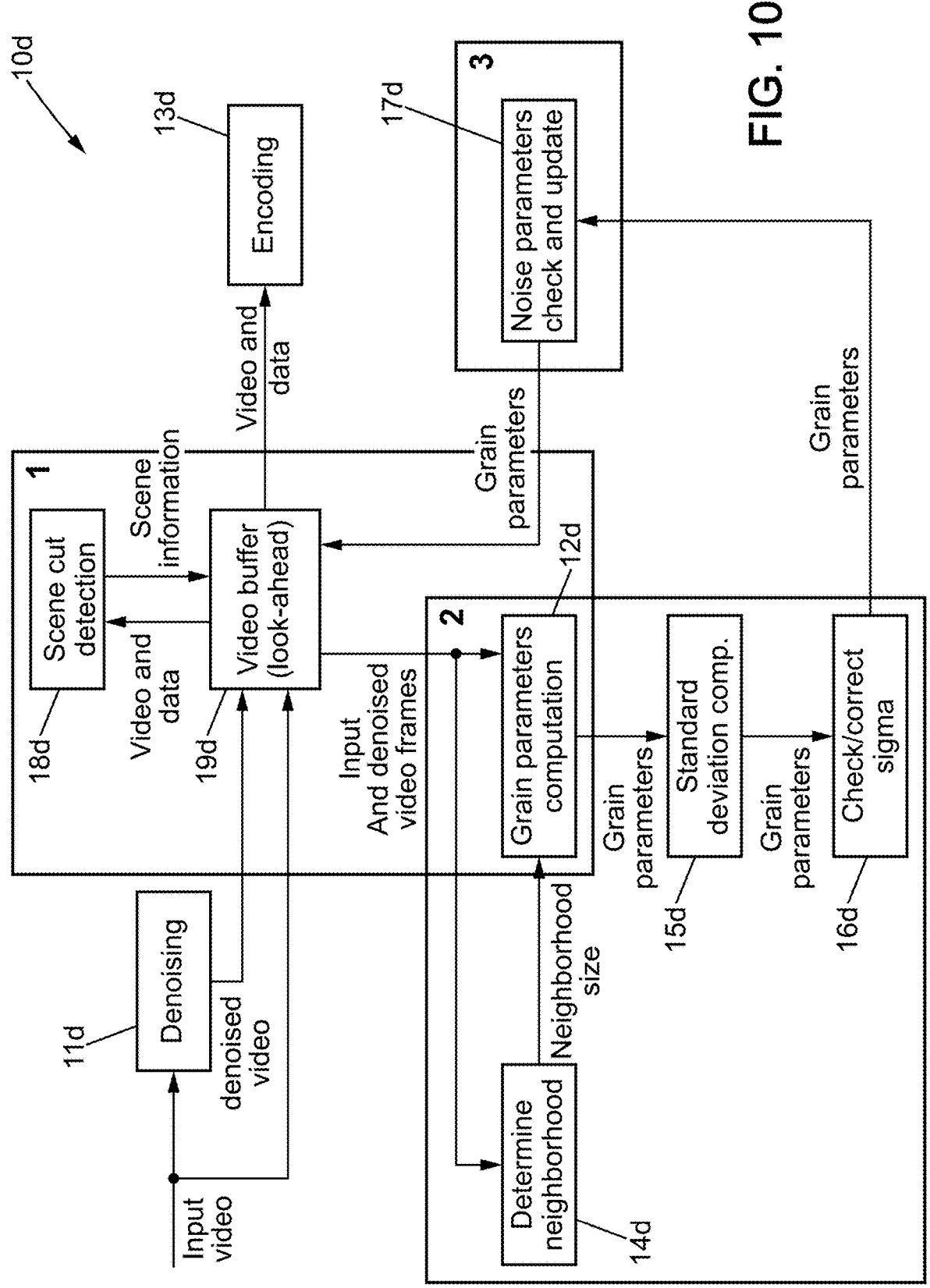
FIG. 10 is a block diagram illustrating an exemplary video encoder in which the proposed image analysis methods, grain parameter estimation methods, and/or video analysis methods may be implemented in accordance with one or more embodiments of the present subject disclosure.

FIG. 10 is a block diagram illustrating an exemplary video encoder in which the proposed image analysis methods, grain parameter estimation methods, and/or video analysis methods may be implemented in accordance with one or more embodiments of the present subject disclosure.

As shown in FIG. 10, a video encoder 10d configured for implementing the image analysis methods, grain parameter estimation methods, and/or video analysis methods proposed in the present subject disclosure may comprise engines or functions that are similar to those comprised in the encoders 10, 10a, 10b, and 10c illustrated on FIGS. 1, 7a, 8a, and 9a: the encoder 10d may comprise a denoising engine 11d, a grain parameters computation engine 12d, and an encoding engine 13d which respectively provide functions similar to the corresponding engines described above in relation to that illustrated on FIGS. 1, 7a, 8a, and 9a.

In addition, the encoder 10d may comprise in some embodiments a scene cut detection engine 18d and a video buffer engine 19d which may respectively provide functions similar to the corresponding engines described above in relation to that illustrated on FIG. 9a. The scene cut detection engine 18d, video buffer engine 19d, and grain parameter computation engine 12d may be configured to be combined together and with other functions and/or engines of the encoder 10d to form a video grain analysis function block 1 of the video encoder 10d, and in combination with other functions and/or engines of the encoder 10d perform operations implementing one or more embodiments of the video analysis methods of the present subject disclosure.

In some embodiments, the encoder 10d may also comprise a neighborhood engine 14d, a standard deviation computation engine 15d, and a check/correct sigma engine 16d which may respectively provide functions similar to the corresponding engines described above in relation to that illustrated on FIG. 7a. The neighborhood engine 14d, standard deviation computation engine 15d, check/correct sigma engine 16d, and grain parameter computation engine 12d may be configured to be combined together and with other functions and/or engines of the encoder 10d to form an image grain analysis block 2 of the video encoder 10d, and in combination with other functions and/or engines of the encoder 10d perform operations implementing one or more embodiments of the image analysis methods of the present subject disclosure.

In some embodiments, the encoder 10d may also comprise a determine a noise parameters check and update engine 17d which may provide functions similar to the corresponding engine described above in relation to that illustrated on FIG. 8a. The noise parameters check and update engine 17d may be configured to be combined with other functions and/or engines of the encoder 10d to form an grain parameter estimation block 3 of the video encoder 10d, and in combination with other functions and/or engines of the encoder 10d perform operations implementing one or more embodiments of the grain parameter estimation methods of the present subject disclosure.

FIG. 10 therefore shows an exemplary video encoding system 10d configured for implementing various combinations of the image analysis methods, Analysis parameters estimation methods and/or video analysis methods of the present subject disclosure through respective functions and/or engines illustrated on FIG. 10.

Depending on the embodiment, the image analysis methods, Analysis parameters estimation methods and/or video analysis methods can be implemented separately or combined together in an improved image processing system, image encoding system, or video encoding system as that illustrated on FIG. 10.

Figure 11:
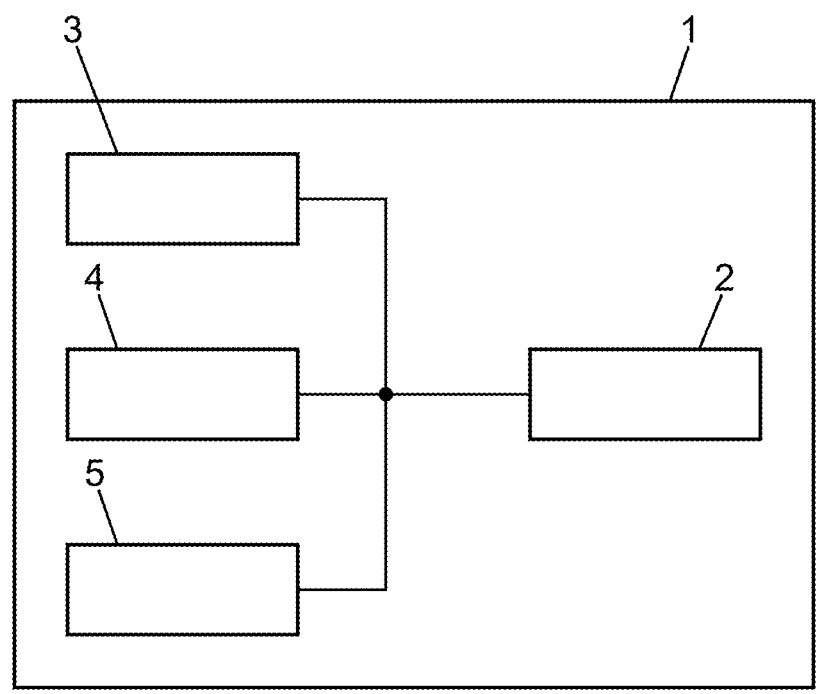
FIG. 11 illustrates an exemplary apparatus or unit 1 configured to use one or more image processing features in accordance with one or more embodiments of the present subject disclosure.

FIG. 11 illustrates an exemplary apparatus or unit 1 configured to use one or more image processing features in accordance with embodiments of the present subject disclosure.

The apparatus 1, which may comprise one or more computers, includes a control engine 2, an image processing engine 3, a data communication engine 4, a memory 5, and a power supply (e.g., a battery, plug-in power supply, etc.) (not represented on the figure). In the architecture illustrated on FIG. 11, all of the video processing engine 3, data communication engine 4, and memory 5 are operatively coupled with one another through the control engine 2.

In some embodiments, the image processing engine 3 is configured to perform various aspects of embodiments of one or more of the proposed methods for network management as described herein.

In some embodiments, the data communication engine 4 is configured to receive input video data and output an encoded bit stream, and process received input video data in the case of an encoder.

The control engine 2 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 2 may also comprise, or may be in communication with, computer storage media, such as, without limitation, the memory 5, capable of storing computer program instructions or software code that, when executed by the processor, causes the processor to perform the elements described herein. In addition, the memory 5 may be any type of data storage computer storage medium, capable of storing a data structure representing a computer network to which the apparatus 1 belongs, coupled to the control engine 2 and operable with the data communication engine 4 and the image processing engine 3 to facilitate management and processing of video data stored in association therewith.

In embodiments of the present subject disclosure, the apparatus 1 is configured for performing one or more of the image processing methods described herein. The apparatus 1 may in some embodiments be included in an image encoder or, depending on the embodiments, in a video encoder or a video codec.

It will be appreciated that the apparatus 1 shown and described with reference to FIG. 11 is provided by way of example only. Numerous other architectures, operating environments, and configurations are possible. Other embodiments of the node may include fewer or greater number of components, and may incorporate some or all of the functionality described with respect to the apparatus components shown in FIG. 11. Accordingly, although the control engine 2, image processing engine 3, data communication engine 4, and memory 5 are illustrated as part of the apparatus 1, no restrictions are placed on the location and control of components 2-5. In particular, in other embodiments, components 2-5 may be part of different entities or computing systems.

The proposed method may be used for the processing, for purposes of encoding or compression, or decoding or decompression, of input data which may correspond, depending on the embodiment, to an image, a picture, a video frame, or video data.

While the present subject disclosure has been described with respect to preferred embodiments, those skilled in the art will readily appreciate that various changes and/or modifications can be made to the subject disclosure without departing from the spirit or scope of the present subject disclosure as defined by the appended claims.

Although this subject disclosure has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the present subject disclosure. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method of processing an image, the method comprising:
   determining estimates of parameters of an auto-regressive, AR, parametric model of noise contained in the image, according to which a current noise pixel is computed as a combination of a linear combination of P previous noise pixels in a causal neighborhood of the current noise pixel weighted by respective AR model linear combination parameters ($\varphi_1, \ldots, \varphi_P$) with a generated noise sample corresponding to an additive Gaussian noise of AR model variance parameter ($\sigma$);
   performing a convergence check loop, wherein each iteration of the convergence check loop comprises:
      generating a noise template of noise pixels based on the estimated AR model parameters, wherein the noise template is of a predetermined pixel size smaller than the pixel size of the image;
      determining an estimate ($\sigma_P$) of a variance of the noise template;
      if the estimated variance ($\sigma_P$) is below a first predetermined threshold ($T_{min}$) or above a second predetermined threshold ($T_{max}$), proportionally decreasing one or more of the AR model linear combination parameters ($\varphi_1, \ldots, \varphi_P$) with a predetermined correcting factor, and performing a new iteration of the convergence check loop;
      otherwise exiting the convergence check loop.

2. The method according to claim 1, wherein the AR model is configured to model grain contained in the image.

3. The method according to claim 1, performed at an encoder configured for encoding the image, wherein the predetermined pixel size of the noise template is chosen corresponding to the pixel size of a noise synthesis template used at a decoder to synthesize film grain based on the AR model.

4. The method according to claim 1, wherein the predetermined pixel size of the noise template is chosen to be 64×64 pixels.

5. The method according to claim 1, wherein proportionally decreasing the AR model linear combination parameters ($\varphi_1, \ldots, \varphi_P$) with the predetermined correcting factor comprises dividing each of the AR model linear combination parameters ($\varphi_1, \ldots, \varphi_P$) by the predetermined correcting factor, wherein the predetermined correcting factor is greater than 1.

6. The method according to claim 1, wherein the predetermined correcting factor is equal to 1.4.

7. The method according to claim 1, wherein the first predetermined threshold ($T_{min}$) is defined based on the additive Gaussian noise of AR model variance parameter ($\sigma$).

8. The method according to claim 1, wherein the second predetermined threshold ($T_{max}$) is defined based on the additive Gaussian noise of AR model variance parameter ($\sigma$).

9. The method according to claim 1, wherein the first predetermined threshold ($T_{min}$) is defined as comprising the additive Gaussian noise of AR model variance parameter ($\sigma$) divided by a first predetermined scaling factor ($K_{min}$).

10. The method according to claim 1, wherein the second predetermined threshold ($T_{max}$) is defined as comprising the additive Gaussian noise of AR model variance parameter ($\sigma$) multiplied by a second predetermined scaling factor ($K_{max}$).

11. The method according to claim 1, wherein at least one of the AR model linear combination parameters ($\varphi_1, \ldots, \varphi_P$) is preset to zero.

12. The method according to claim 11, wherein a number of AR model linear combination parameters that are preset to zero is chosen based on a pixel resolution of the image.

13. An apparatus, the apparatus comprising a processor and a memory operatively coupled to the processor, wherein the processor is configured to perform a method of processing an image, the method comprising:
determining estimates of parameters of an auto-regressive, AR, parametric model of noise contained in the image, according to which a current noise pixel is computed as a combination of a linear combination of P previous noise pixels in a causal neighborhood of the current noise pixel weighted by respective AR model linear combination parameters ($\varphi_1, \ldots, \varphi_P$) with a generated noise sample corresponding to an additive Gaussian noise of AR model variance parameter ($\sigma$);
performing a convergence check loop, wherein each iteration of the convergence check loop comprises:
generating a noise template of noise pixels based on the estimated AR model parameters, wherein the noise template is of a predetermined pixel size smaller than the pixel size of the image;
determining an estimate ($\varphi_P$) of a variance of the noise template;
if the estimated variance ($\varphi_P$) is below a first predetermined threshold ($T_{min}$) or above a second predetermined threshold ($T_{max}$), proportionally decreasing one or more of the AR model linear combination parameters ($\varphi_1, \ldots, \varphi_P$) with a predetermined correcting factor, and performing a new iteration of the convergence check loop;
otherwise exiting the convergence check loop.

14. A video encoder, configured to encode video content comprising a plurality of images, the video encoder comprising an apparatus according to claim 13 configured to process images of an input video.

15. The apparatus according to claim 13, wherein the AR model is configured to model grain contained in the image.

16. The apparatus according to claim 13, wherein the first predetermined threshold ($T_{min}$) is defined based on the additive Gaussian noise of AR model variance parameter ($\sigma$).

17. The apparatus according to claim 13, wherein the second predetermined threshold ($T_{max}$) is defined as comprising the additive Gaussian noise of AR model variance parameter ($\sigma$) multiplied by a second predetermined scaling factor ($K_{max}$).

18. A non-transitory computer-readable medium encoded with executable instructions which, when executed, causes an apparatus comprising a processor operatively coupled with a memory, to perform a method of processing an image, the method comprising:
determining estimates of parameters of an auto-regressive, AR, parametric model of noise contained in the image, according to which a current noise pixel is computed as a combination of a linear combination of P previous noise pixels in a causal neighborhood of the current noise pixel weighted by respective AR model linear combination parameters ($\varphi_1, \ldots, \varphi_P$) with a generated noise sample corresponding to an additive Gaussian noise of AR model variance parameter ($\sigma$);
performing a convergence check loop, wherein each iteration of the convergence check loop comprises:
generating a noise template of noise pixels based on the estimated AR model parameters, wherein the noise template is of a predetermined pixel size smaller than the pixel size of the image;
determining an estimate ($\sigma_P$) of a variance of the noise template;
if the estimated variance ($\sigma_P$) is below a first predetermined threshold ($T_{min}$) or above a second predetermined threshold ($T_{max}$), proportionally decreasing one or more of the AR model linear combination parameters ($\varphi_1, \ldots, \varphi_P$) with a predetermined correcting factor, and performing a new iteration of the convergence check loop;
otherwise exiting the convergence check loop.

19. The non-transitory computer-readable medium according to claim 18, wherein the AR model is configured to model grain contained in the image.

20. The non-transitory computer-readable medium according to claim 18, wherein the first predetermined threshold ($T_{min}$) is defined based on the additive Gaussian noise of AR model variance parameter ($\sigma$).

* * * * *